(12) United States Patent
Baraff et al.

(10) Patent No.: US 8,269,778 B1
(45) Date of Patent: Sep. 18, 2012

(54) SHAPE PRESERVATION OF SIMULATED OBJECTS IN COMPUTER ANIMATION

(75) Inventors: David Baraff, Oakland, CA (US); Christine Waggoner, Berkeley, CA (US)

(73) Assignee: Pixar, Emeryville, CA (US)

( * ) Notice: Subject to any disclaimer, the term of this patent is extended or adjusted under 35 U.S.C. 154(b) by 6 days.

(21) Appl. No.: 12/960,196

(22) Filed: Dec. 3, 2010

Related U.S. Application Data

(63) Continuation-in-part of application No. 11/758,969, filed on Jun. 6, 2007, now Pat. No. 7,864,180, and a continuation-in-part of application No. 11/758,984, filed on Jun. 6, 2007, now Pat. No. 7,864,181, and a continuation-in-part of application No. 11/758,989, filed on Jun. 6, 2007, now Pat. No. 7,852,338.

(60) Provisional application No. 60/812,299, filed on Jun. 9, 2006, provisional application No. 60/812,679, filed on Jun. 8, 2006, provisional application No. 60/812,313, filed on Jun. 8, 2006.

(51) Int. Cl.
*G06T 15/00* (2011.01)

(52) U.S. Cl. ......... 345/473; 345/474; 345/475; 345/156; 345/173; 700/249; 703/2; 703/10; 715/701

(58) Field of Classification Search ............... 345/473, 345/474, 475, 156, 173; 700/249; 703/2, 703/10; 715/701
See application file for complete search history.

(56) References Cited

U.S. PATENT DOCUMENTS

| | | | |
|---|---|---|---|
| 6,370,491 B1 * | 4/2002 | Malthe-Sorenssen et al. | ... 703/2 |
| 7,089,166 B2 * | 8/2006 | Malthe-Sorenssen et al. | . 703/10 |
| 7,515,304 B2 * | 4/2009 | Ito et al. | 358/3.23 |
| 7,657,345 B2 * | 2/2010 | Endo et al. | 700/249 |
| 7,791,606 B2 * | 9/2010 | Hadap | 345/473 |
| 7,895,411 B2 * | 2/2011 | Maher et al. | 712/3 |
| 8,020,095 B2 * | 9/2011 | Braun et al. | 715/701 |
| 8,072,422 B2 * | 12/2011 | Rosenberg et al. | 345/156 |

* cited by examiner

*Primary Examiner* — Phu K Nguyen
(74) *Attorney, Agent, or Firm* — Kilpatrick Townsend & Stockton LLP

(57) ABSTRACT

This disclosure relates to computer-generated imagery (CGI) and computer-aided animation. More specifically, this disclosure relates to techniques for preserving the shape of simulated and dynamic objects for use in CGI and computer-aided animation.

20 Claims, 17 Drawing Sheets

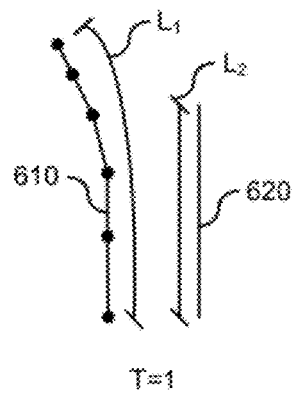
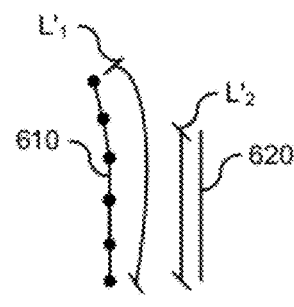
FIG. 6A    FIG. 6B
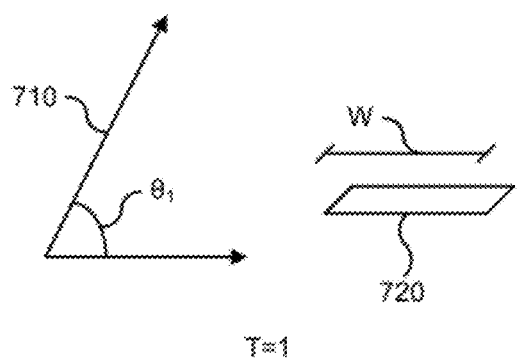
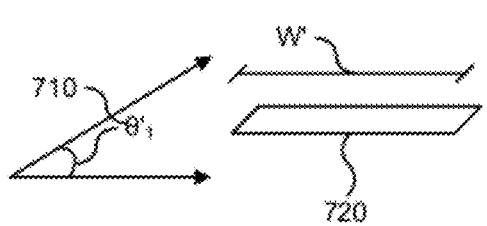
FIG. 7A    FIG. 7B

US 8,269,778 B1

SHAPE PRESERVATION OF SIMULATED OBJECTS IN COMPUTER ANIMATION

CROSS-REFERENCES TO RELATED APPLICATIONS

This Application is a Continuation-in-Part of U.S. patent application Ser. No. 11/758,969 filed Jun. 6, 2007 and entitled "Methods and Apparatus for Auto-Scaling Properties of Simulated Objects," which claims priority to U.S. Provisional Patent Application No. 60/812,299, filed Jun. 8, 2006 and entitled "Methods and Apparatus for Auto-Scaling Properties of Simulated Objects," the entire disclosures of which are hereby incorporated by referenced for all purposes. This application is a Continuation-in-Part of U.S. patent application Ser. No. 11/758,984 filed Jun. 6, 2007 and entitled "Shape Friction: Shape Preservation of Simulated Objects in Computer Animation" which claims priority to U.S. Provisional Patent Application No. 60/812,679, filed Jun. 8, 2006 and entitled "Shape Friction: Shape Preservation of Simulated Objects in Computer Animation," the entire disclosures of which are hereby incorporated by referenced for all purposes. This Application is a Continuation-in-Part of U.S. patent application Ser. No. 11/758,989 filed Jun. 6, 2007 and entitled "Velocity Drag: Shape Preservation of Simulated Objects in Computer Animation," which claims priority to U.S. Provisional Patent Application No. 60/812,313, filed Jun. 8, 2006 and entitled "Velocity Drag: Shape Preservation of Simulated Objects in Computer Animation," the entire disclosures of which are hereby incorporated by referenced for all purposes.

BACKGROUND

This disclosure relates to computer-generated imagery (CGI) and computer-aided animation. More specifically, this disclosure relates to techniques for preserving the shape of simulated and dynamic objects for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects.

These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. The geometric description of the objects may include a number of animation control variables (avars) and values for the avars. In some instances, an animator may also pose the objects within the image or sequence and specify motions and positions of the objects over time to create an animation. In other instances, motions and positions of some objects, such as hair, clothing, and plants are usually too complex for a human animator to directly control at every stage of a computer animation. Instead, the human animator specifies the physics and/or physical properties of one or more dynamic or simulated objects. A computer program then employs physically-based numerical methods and techniques to simulate the motions and positions of these objects over time based on the physics or physical properties of the individual objects.

For simulated clothing objects, for example, the animator specifies the physical properties and construction of the cloth. For example, the animator specifies how the cloth bends due to forces or collisions with solid objects. The animator further specifies how the cloth deforms or collides with itself. Moreover, the animator specifies external forces that act on the cloth, such as gravity and wind.

In addition to modeling the physical properties of the simulated objects, the animator specifies motions and positions of kinematic or non-simulated objects (e.g., characters upon which the clothing objects rest). The animation of a non-simulated object generally is independent of and otherwise unaffected by motions and positions of simulated objects. However, the motions and positions of the non-simulated objects often are the principal influencer of motions and positions of simulated objects, as clothing and hair are likely to be associated with a kinematic character.

Consider a computer animation of a human character standing upright, wearing a jacket. The human character is a kinematic or non-simulated object that is directly animated by the skilled human animator. The animator specifies the physics (e.g., the physical properties) of the jacket which is a simulated object. In addition, the animator models how the jacket is associated with and worn by the human character. During simulation, the computer program simulates the motions and positions of the jacket using physically-based numerical techniques in response to external forces and the motions and positions of the human character.

If the physical properties and external forces acting on a simulated object are accurately modeled, the resulting motion of the simulated object will be plausible and seemingly realistic. In our jacket example, the cloth of the jacket should hang down and fold naturally. Furthermore, the cloth should react according to the motions and positions of the human character when the human character wears the jacket. However, modeling the simulated objects to be truly accurate is a delicate balance between the limitations and complexities of the animator's knowledge of physics and particle systems on the one hand and budgetary and time constraints on the other.

In addition, other problems exists with physically-based numerical methods and techniques used in computer animations. A particularly difficult problem in the simulation of secondary or simulated objects, such as cloth, is dealing with creeping or oozing behaviors. A creeping or oozing behavior occurs when motion of a simulated object associated with a non-simulated object continues in a visually unpleasing manner after a change in motion of the non-simulated object.

In the real world, most garments such as shirts, jackets, or pants undergo no significant movement or change in shape when their wearers cease moving. Internal forces in clothes, and friction between the clothes and their wearer, generally lock the clothes into a fixed position when the wearer's motion ceases. Typically, the clothes stops moving far less than a second after the wearer does. Although some garments, such as long dresses or ties, typically swing back and forth for some period of time, this desired and realistic motion is different from undesirable creeping or oozing behaviors that result during simulation using physically-based numerical methods and techniques.

Creating simulation programs for simulated objects, such as cloth, that can achieve the same effect after the wearer ceases moving has been difficult. One solution is to instruct the computer program during the simulation of our jacket example to freeze the cloth of the jacket in place whenever the human character ceases moving. The cloth then would be allowed to move again, when the human character begins to move. A problem with this solution is that our human character rarely remains exactly motionless. Typically, even when an animated character ceases movement, some small amount of "keep-alive" motion is applied. For example, the animator may rotate limbs of the character a few degrees or have the character sway back and forth just a little. It is during keep-alive motion, that the creeping or oozing of simulated objects is most apparent.

Accordingly, what is desired is to solve one or more of the problems relating to preserving the shape of simulated and dynamic objects for use in CGI and computer-aided animation, some of which may be discussed herein. Additionally, what is desired is to reduce some of the drawbacks relating to preserving the shape of simulated and dynamic objects for use in CGI and computer-aided animation, some of which may be discussed herein.

BRIEF SUMMARY

This disclosure relates to computer-generated imagery (CGI) and computer-aided animation. More specifically, this disclosure relates to techniques for preserving the shape of simulated and dynamic objects for use in CGI and computer-aided animation.
Auto-Scaling Object Properties In various embodiments, a method for simulating objects includes receiving a metric associated with a reference object. A value associated with a property of a simulated object is adjusted in response to the metric. The value of the property is related to a rest state associated with the simulated object.

In one embodiment, the property is a geometric property of the simulated object. Some examples of geometric properties are dimensions (e.g., length, width, height), angle, momentum and rotation, mass, density, and the like. The rest state associated with the simulated object may be related to shape of the simulated object in response to one or more internal forces associated with the simulated object.

In some embodiments, adjusting the value associated with the property includes either increasing or decreasing the value of the property in response to the metric. Receiving the metric associated with the reference object may include determining a set of values associated with one or more physically exaggerated animation variables of the reference object. Receiving the metric associated with the reference object may further include determining a set of measurements associated with one or more properties of the reference object, wherein the one or more properties comprise at least one of a length, an angle, motion, position, and mass. Receiving the metric associated with the reference object may further include calculating a length between one or more locations associated with a surface of the reference object.

In further embodiments, the reference object is a non-simulated character object. The simulated object may be a cloth object. The simulated object may be rendered according to the rest state associated with the simulated object. The simulated object may also be displayed as an element of a computer animation display.

In various embodiments, a computer program product is stored on a computer readable medium for simulating objects. The computer program product includes code for receiving a metric associated with a reference object, and code for adjusting a value associated with a property of a simulated object in response to the metric, wherein the value of the property is related to a rest state associated with the simulated object.

In one embodiment, a system for simulating objects includes a processor and a memory. The memory is coupled to the processor and configured to store a set of instructions which when executed by the processor configure the processor to receive a metric associated with a reference object, and adjust a value associated with a property of a simulated object in response to the metric, wherein the value of the property is related to a rest state associated with the simulated object.

In some embodiments, a method for simulating elements of a computer animation display includes identifying a portion of a reference object. A change is detected in the portion of the reference object. In response to the change, a property of a simulated object is adjusted where the property is related to the at-rest shape of the simulated object.

One or more properties associated with the portion of the reference object may then be monitored. Detecting the change in the portion of the reference object may include detecting a change in a set of values associated with the one or more properties. Adjusting the property of the simulated object may include adjusting a value associated with a geometric property of the simulated object. Adjusting the property of the simulated object may include adjusting at least one of mass and density associated with the simulated object.

In some embodiments, a computer program product is stored on a computer readable medium for simulating elements of a computer animation display. The computer program product includes code for identifying a portion of a reference object, code for detecting a change in the portion of the reference object, and code for adjusting a property of a simulated object in response to the change, the property related to the at-rest shape of the simulated object.

In some embodiments, a system for simulating elements of a computer animation display includes a processor and a memory. The memory is coupled to the processor and configured to store a set of instructions which when executed by the processor configure the processor to identify a portion of a reference object, detect a change in the portion of the reference object, and in response to the change, adjust a property of a simulated object, the property related to the at-rest shape of the simulated object.

Shape Friction

In various embodiments, a method for simulating objects includes receiving a target shape associated with a simulated object. A difference is determined between the target shape and a measured shape associated with the simulated object. One or more forces are generated to act on the simulated object to reduce the difference between the target shape and the measured shape.

In some embodiments, the target shape is updated when the difference between the target shape and the measured shape exceeds a predetermined tolerance. Updating the target shape may include reducing the target shape to move the target shape closer to the measured shape. Receiving the target shape associated with the simulated object may include receiving a target distance between a first particle associated with the simulated object and a second particle associated with the simulated object.

Distance may be measured between a first particle associated with the simulated object and a second particle associated with the simulated object to determine the measured shape associated with the simulated object. Determining the difference between the target shape and the measured shape associated with the simulated object may include determining a difference between a target distance and a measured distance. Determining the difference between the target shape and the measured shape associated with the simulated object may include determining a difference between a target displacement and a measured displacement.

In one embodiment, the amount of the one or more forces is reduced. Reducing the amount of the one or more forces may include reducing the amount of the one or more forces based on a scaling factor determined in response to a difference between velocity of a first particle associated with the simulated object and velocity of a second particle associated with the simulated object as the difference between velocities approaches a predetermined threshold. Shape of the simulated object may be determined in response to a reference object associated with the simulated object when a difference in velocities associated with the simulated object exceeds a predetermined threshold. The reference object may include a non-simulated character object. The simulated object may include a cloth object.

In various embodiments, a computer program product is stored on a computer readable medium for simulating objects. The computer program product includes code for receiving a target shape associated with a simulated object, code for determining a difference between the target shape and a measured shape associated with the simulated object, and code for generating one or more forces to act on the simulated object to reduce the difference between the target shape and the measured shape.

In some embodiments, a system for simulating objects includes a processor and a memory coupled to the processor. The memory is configured to store a set of instructions which when executed by the processor cause the processor to receive a target shape associated with a simulated object, determine a difference between the target shape and a measured shape associated with the simulated object, and generate one or more forces to act on the simulated object to reduce the difference between the target shape and the measured shape.

Velocity Drag

In various embodiments, a method for preserving the shape of simulated objects includes receiving velocity of a location associated with a simulated object. Velocity is received of a location associated with a reference object. One or more forces are generated to act on the simulated object to minimize a difference between the velocity of the location associated with the simulated object and the velocity of the location associated with the reference object.

In some embodiments, the location associated with the simulated object may be a point substantially on a surface associated with the simulated object. The location associated with the reference object may be a surface region associated with the reference object. A mapping may be received between the location associated with the simulated object and the location associated with reference object.

In various embodiments, generating the one or more forces to act on the simulated object to minimize the difference between the velocity of the location associated with the simulated object and the velocity of the location associated with the reference object includes generating the one or more forces to act on the location associated with the simulated object to substantially align the velocity of the location associated with the simulated object with the velocity of the location associated with the reference object. The amount of the one or more forces may be reduced as the difference between the velocity of the location associated with the simulated object and the velocity of the location associated with the reference object approaches a predetermined threshold.

In one embodiment, motion of the simulated object may be determined in response to the reference object when the difference between the velocity of the location associated with the simulated object in the velocity of the location associated with the reference object exceeds the predetermined threshold. The reference object may include a non-simulated character object. The simulated object may include a cloth object.

In some embodiments, a computer program product is stored on a computer readable medium for preserving the shape of simulated objects. The computer program product includes code for receiving velocity of a location associated with a simulated object, code for receiving velocity of a location associated with a reference object, and code for generating one or more forces to act on the simulated object to minimize a difference between the velocity of the location associated with the simulated object and the velocity of the location associated with the reference object.

In one embodiment, a system for preserving the shape of simulated objects includes a processor and a memory. The memory is coupled to the processor and configured to store a set of instructions when executed by the processor configured the processor to receive velocity of a location associated with a simulated object, receive velocity of a location associated with a reference object, and generate one or more forces to act on the simulated object to minimize a difference between the velocity of the location associated with the simulated object and the velocity of the location associated with the reference object.

A further understanding of the nature and the advantages of the inventions disclosed herein may be realized by reference of the remaining portions of the specification and the attached drawings.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/ or examples, or the presently understood best mode of any innovations presented within this disclosure.

Auto Scaling Object Properties

Figure 2:
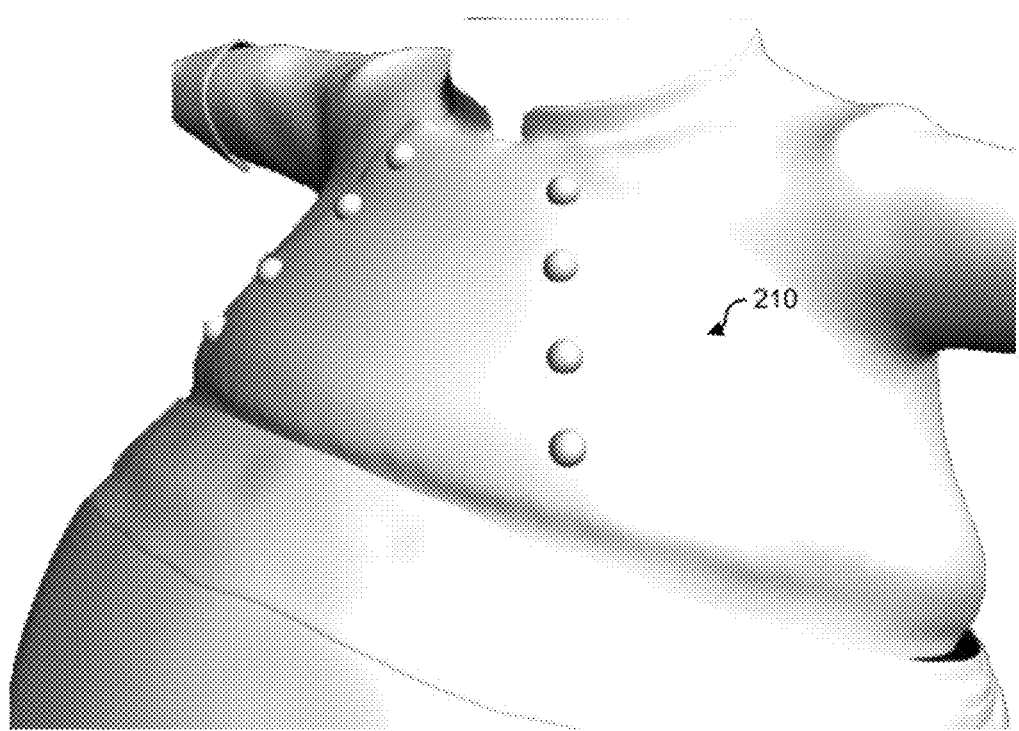

FIG. 2 is a screenshot depicting a human character wearing a jacket at pose-time in one embodiment.

Figure 3A:
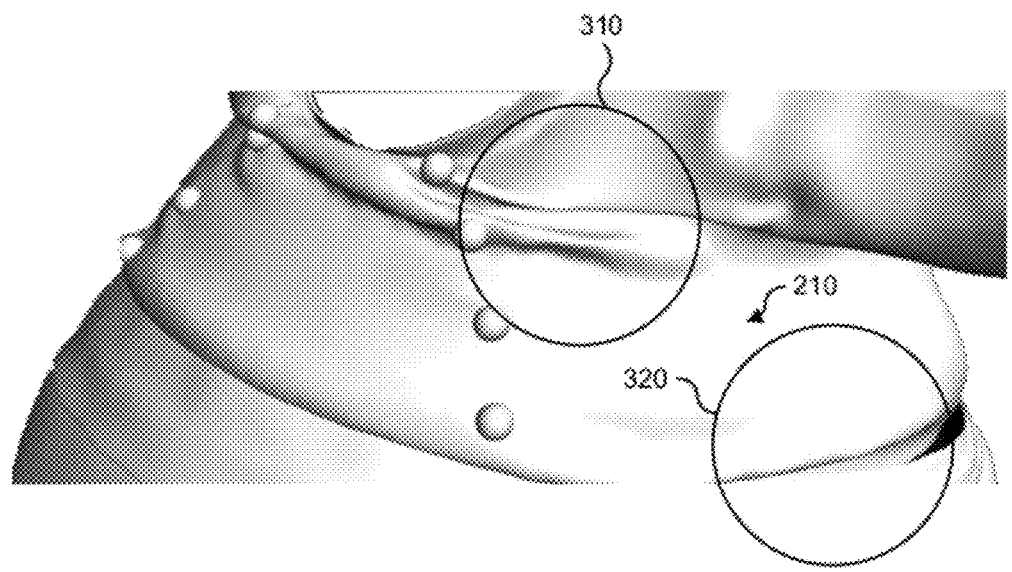

FIG. 3A is a screenshot depicting the human character of FIG. 2 in a physically exaggerated pose where the jacket includes visually undesirable features in one embodiment.

Figure 3B:
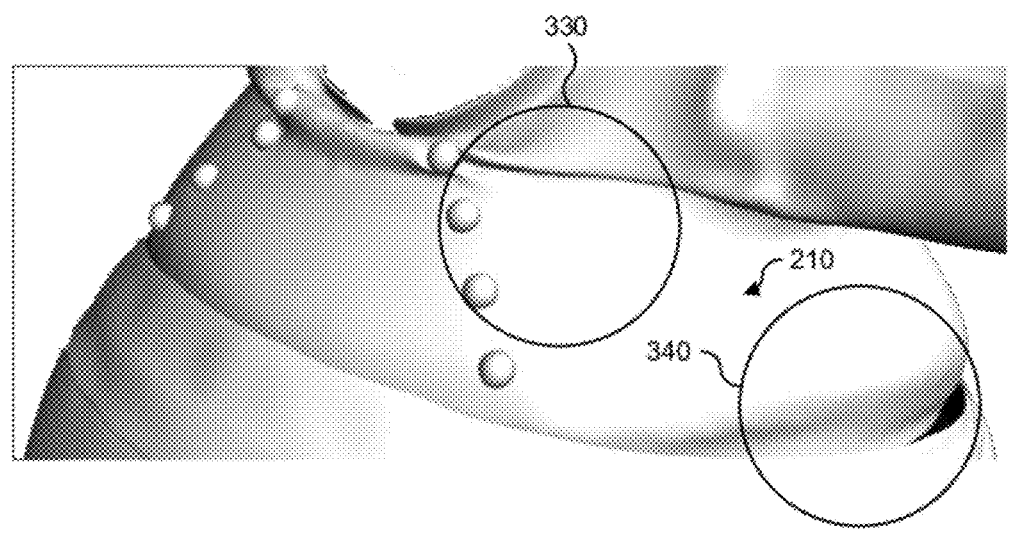

FIG. 3B is a screenshot depicting the human character of FIG. 2 in a physically exaggerated pose where a portion of the jacket has been auto-scaled to reduce visually undesirable features in one embodiment.

Figure 4:
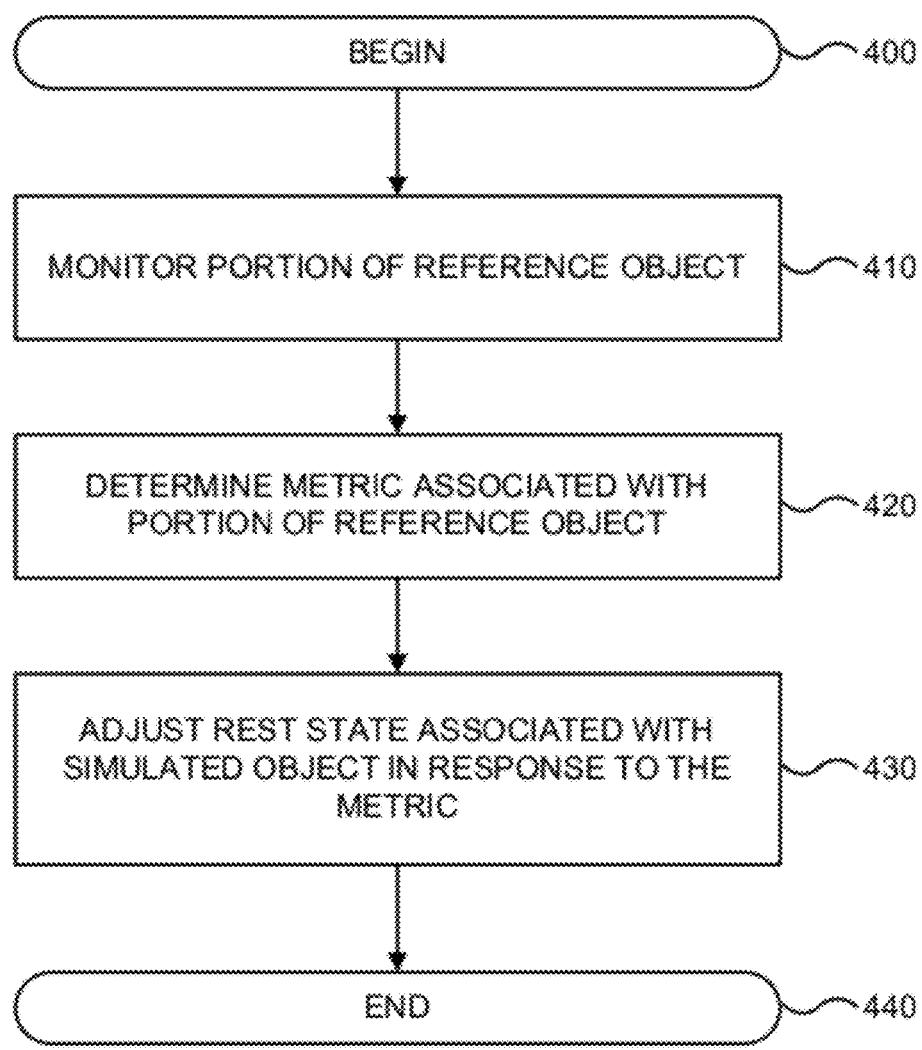

FIG. 4 is a simplified flowchart of a method for auto-scaling properties of a simulated object associated with a reference object in one embodiment.

Figure 5:
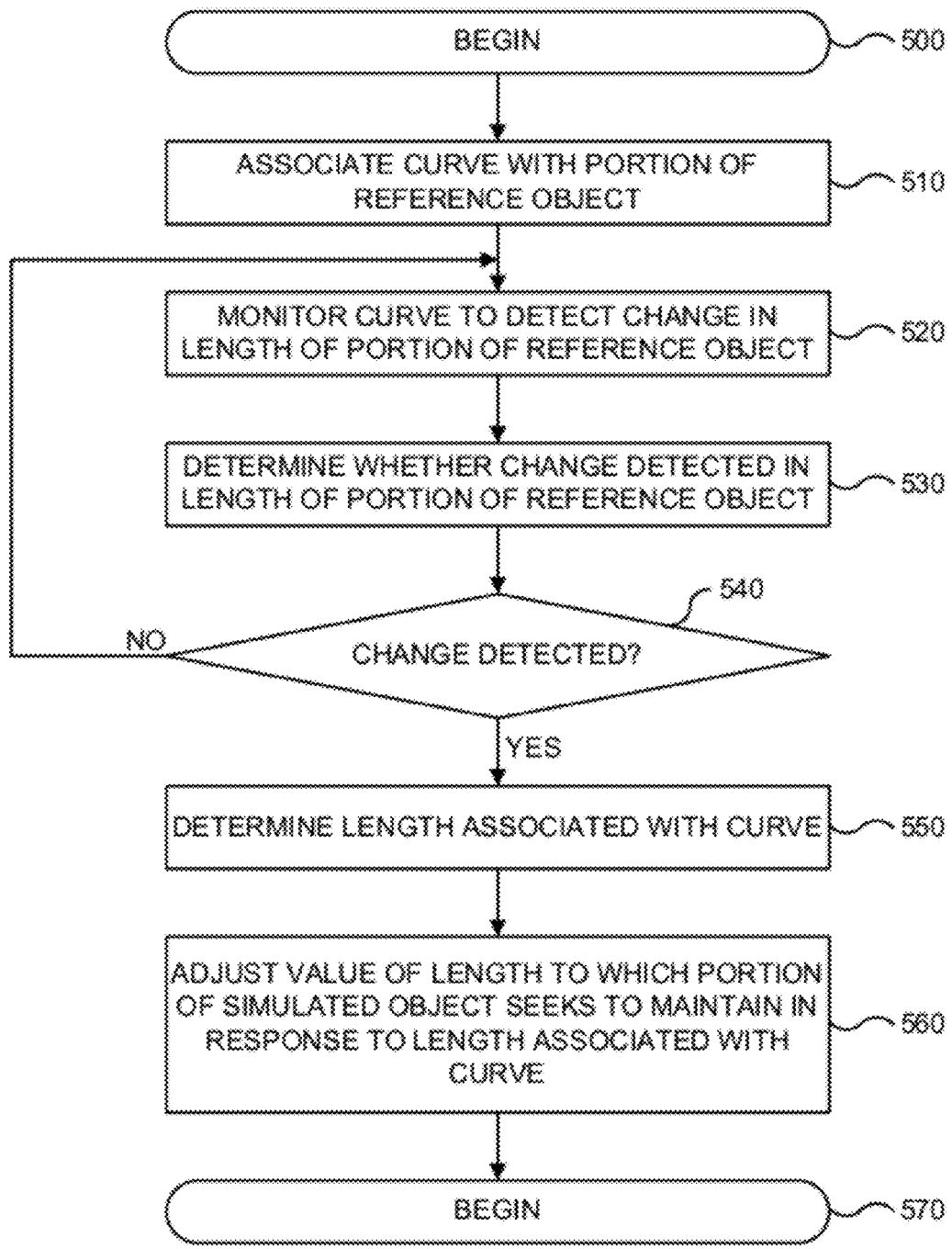

FIG. 5 is a flowchart of a method for auto-scaling the length to which a simulated object seeks to maintain at rest in response to changes in a reference object in one embodiment.

FIGS. 6A and 6B are illustrations depicting auto-scaling length of a simulated object in response to length of a non-simulated object in one embodiment.

FIGS. 7A and 7B are illustrations depicting auto-scaling width of a simulated object in response to an angle associated with a non-simulated object in one embodiment.

Shape Friction

Figure 8A:
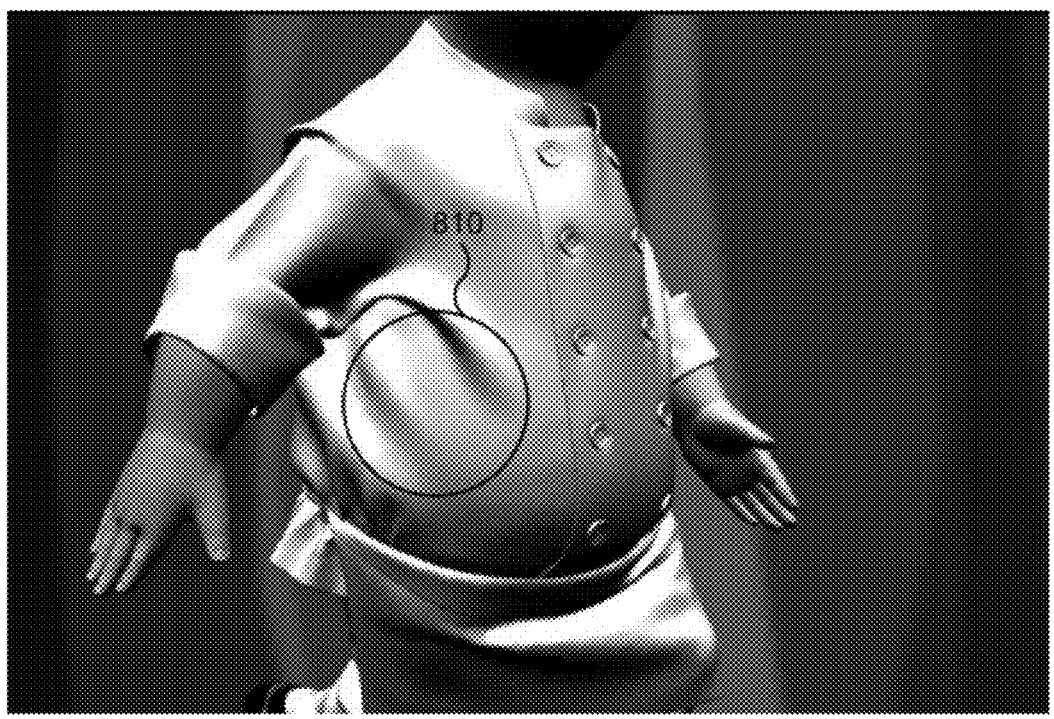
Figure 8B:
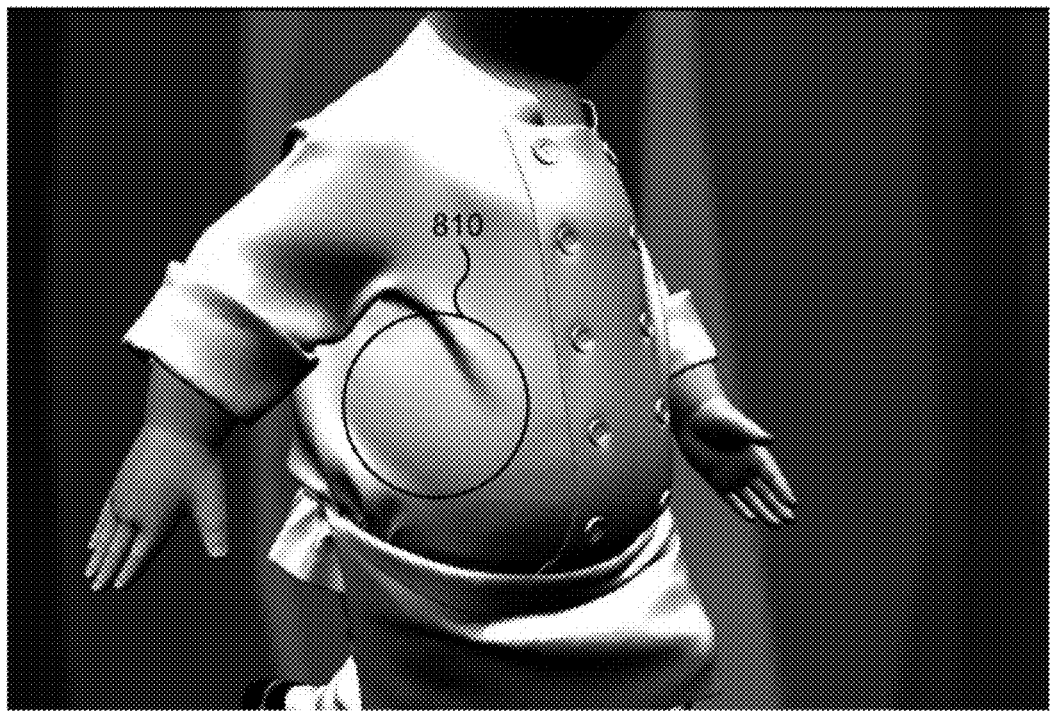

FIGS. 8A and 8B are screenshots of a human character wearing a jacket.

Figure 9:
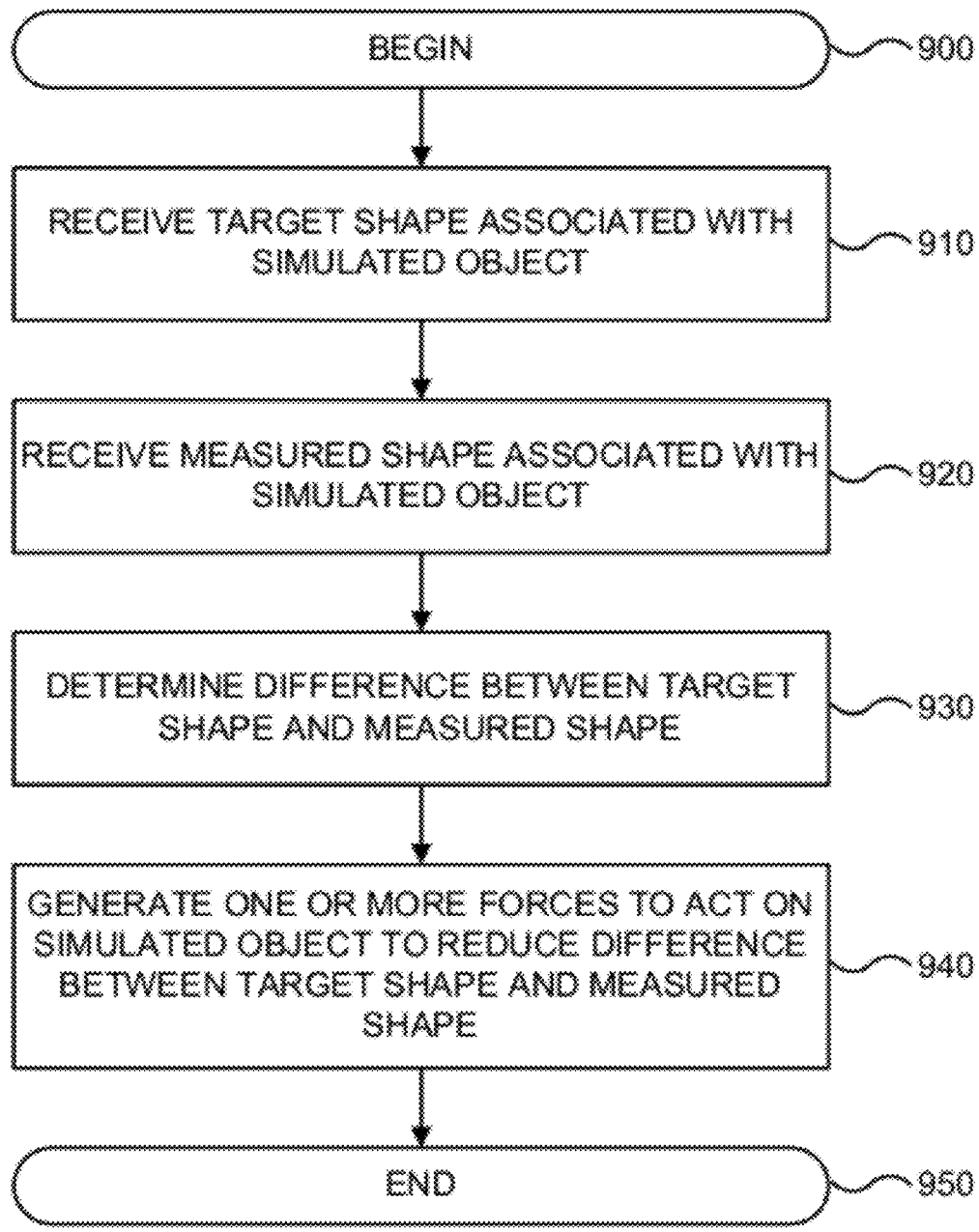

FIG. 9 is a simplified flowchart of a method for preserving shape of a simulated object using shape friction in one embodiment.

Figure 10A:
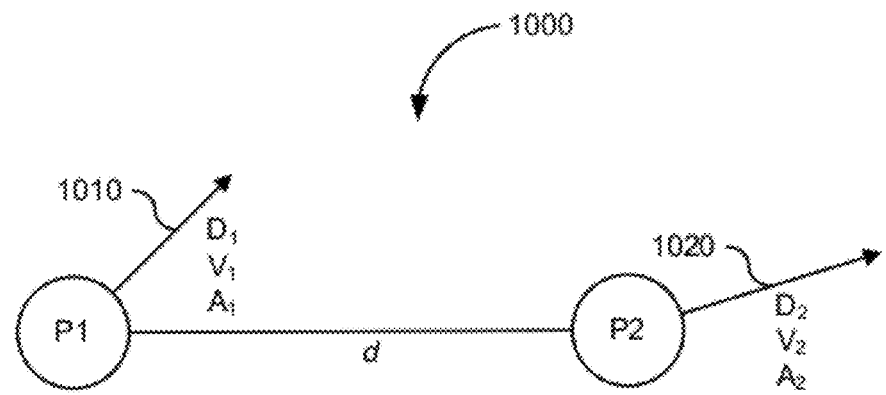

FIG. 10A is simplified block diagram of particles associated with a simulated object in one embodiment.

Figure 10B:
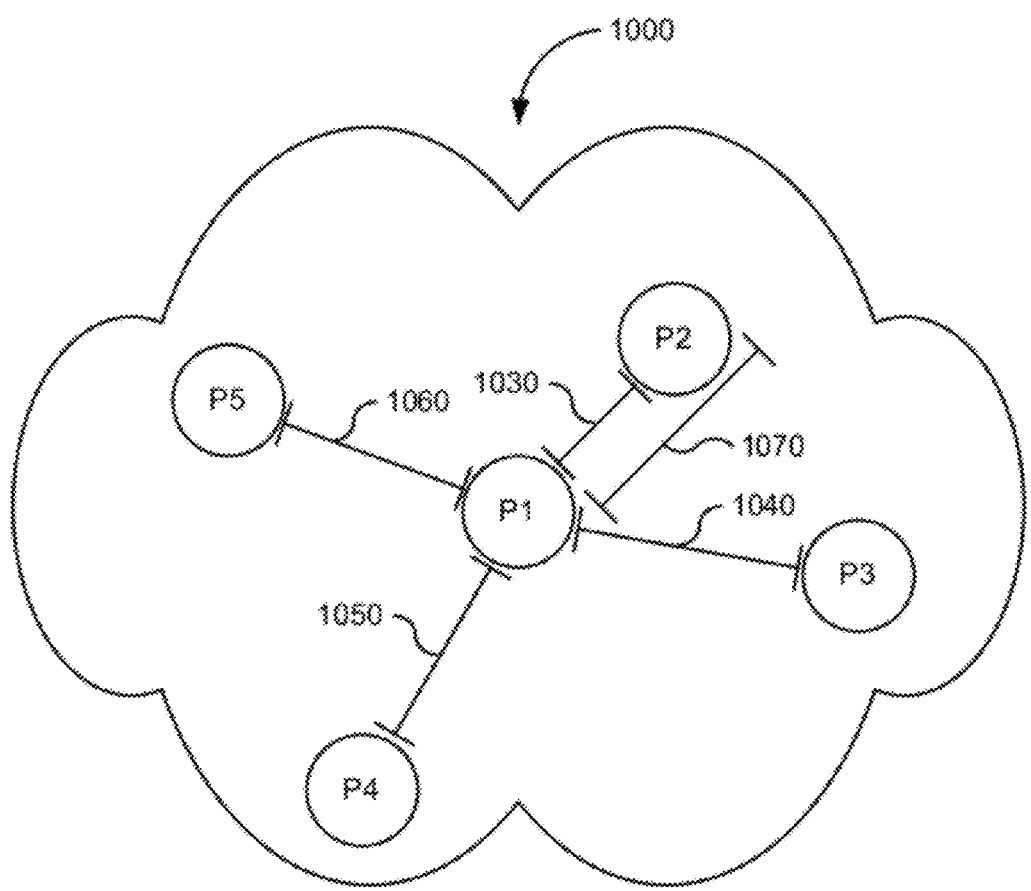

FIG. 10B is simplified block diagram of a particle associated with a simulated object and a reference particle associated with a non-simulated object in one embodiment.

Figure 11A:
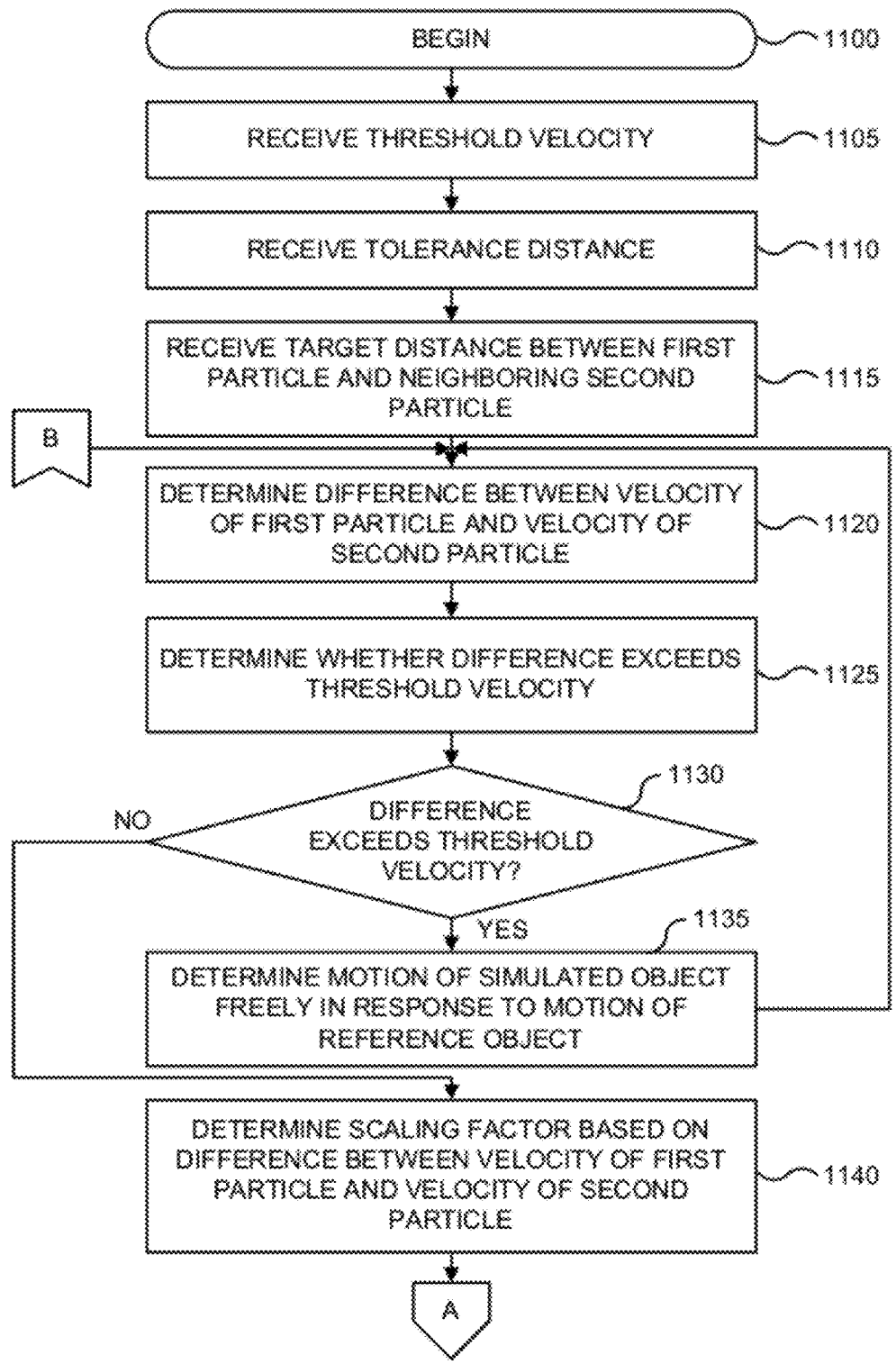
Figure 11B:
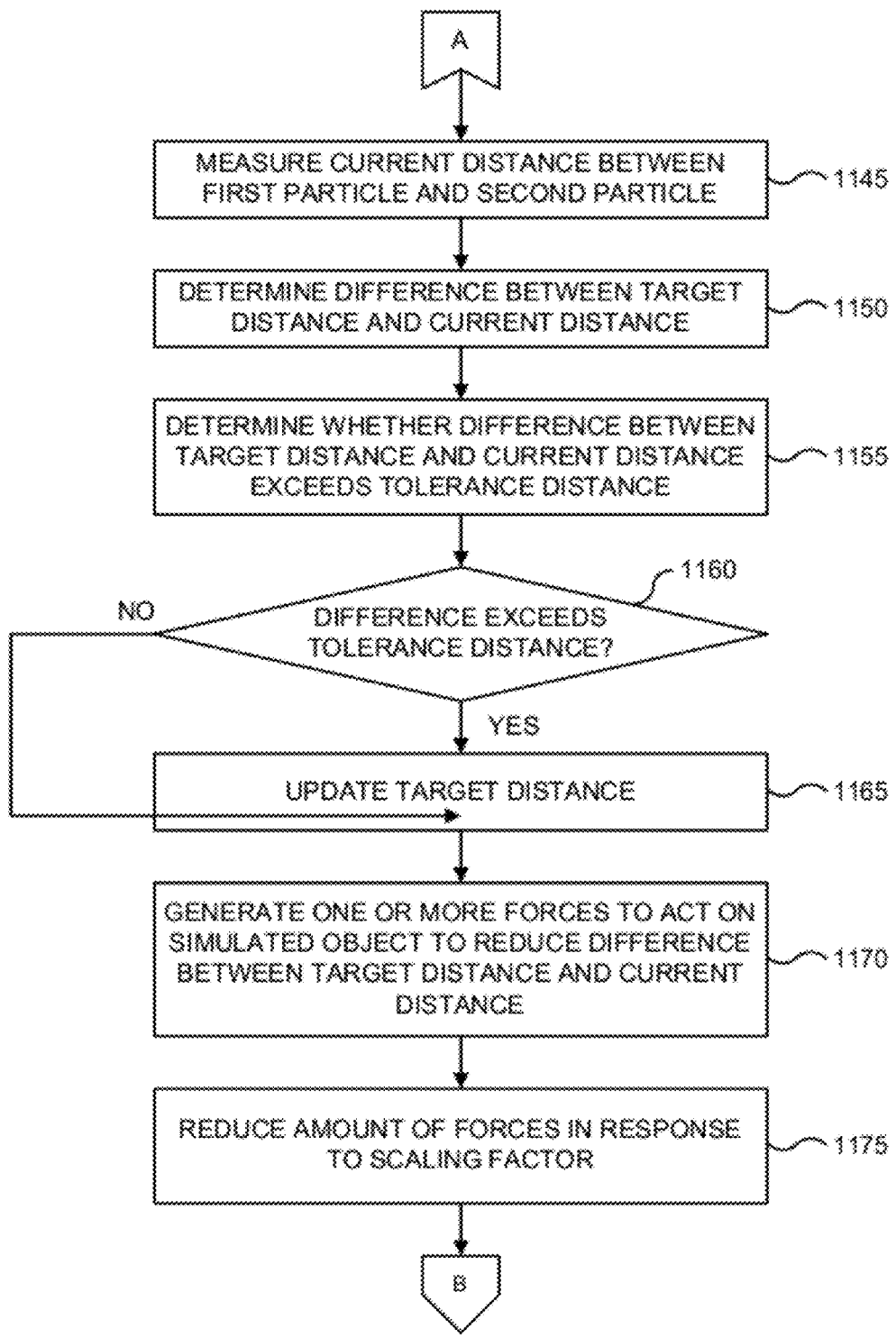

FIGS. 11A and 11B are a flowchart of a method for preserving shape of a simulated object using shape friction during motion in one embodiment.

Velocity Drag

Figure 12A:
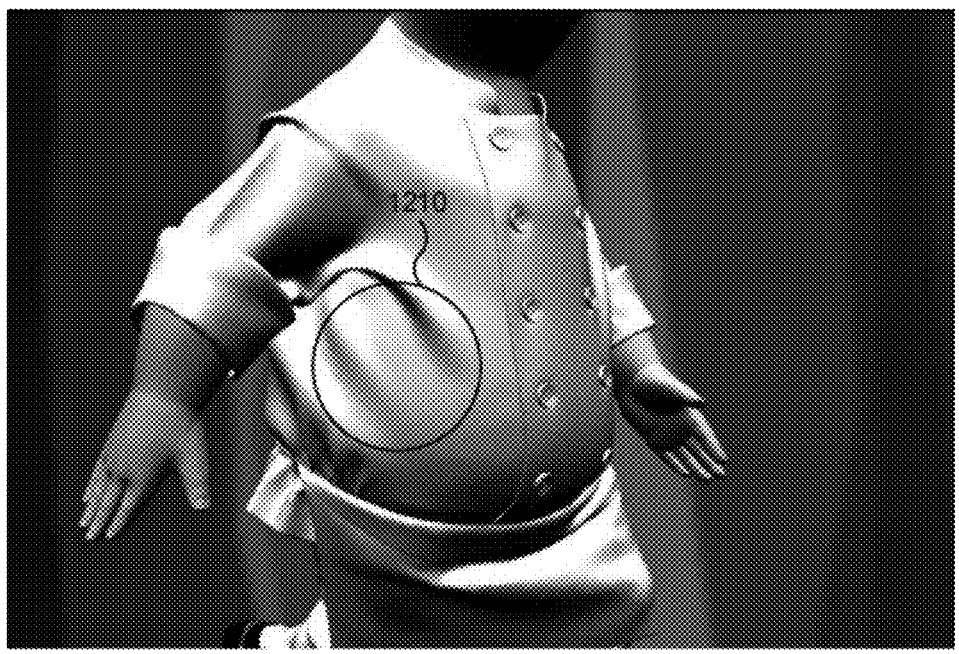
Figure 12B:
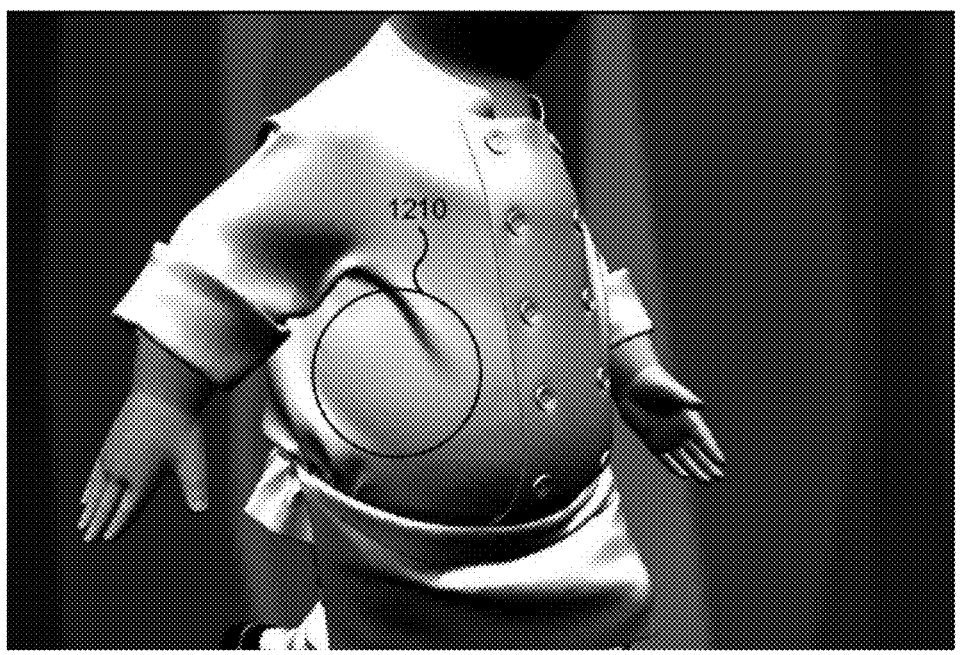

FIGS. 12A and 12B are screenshots of a human character wearing a jacket.

Figure 13:
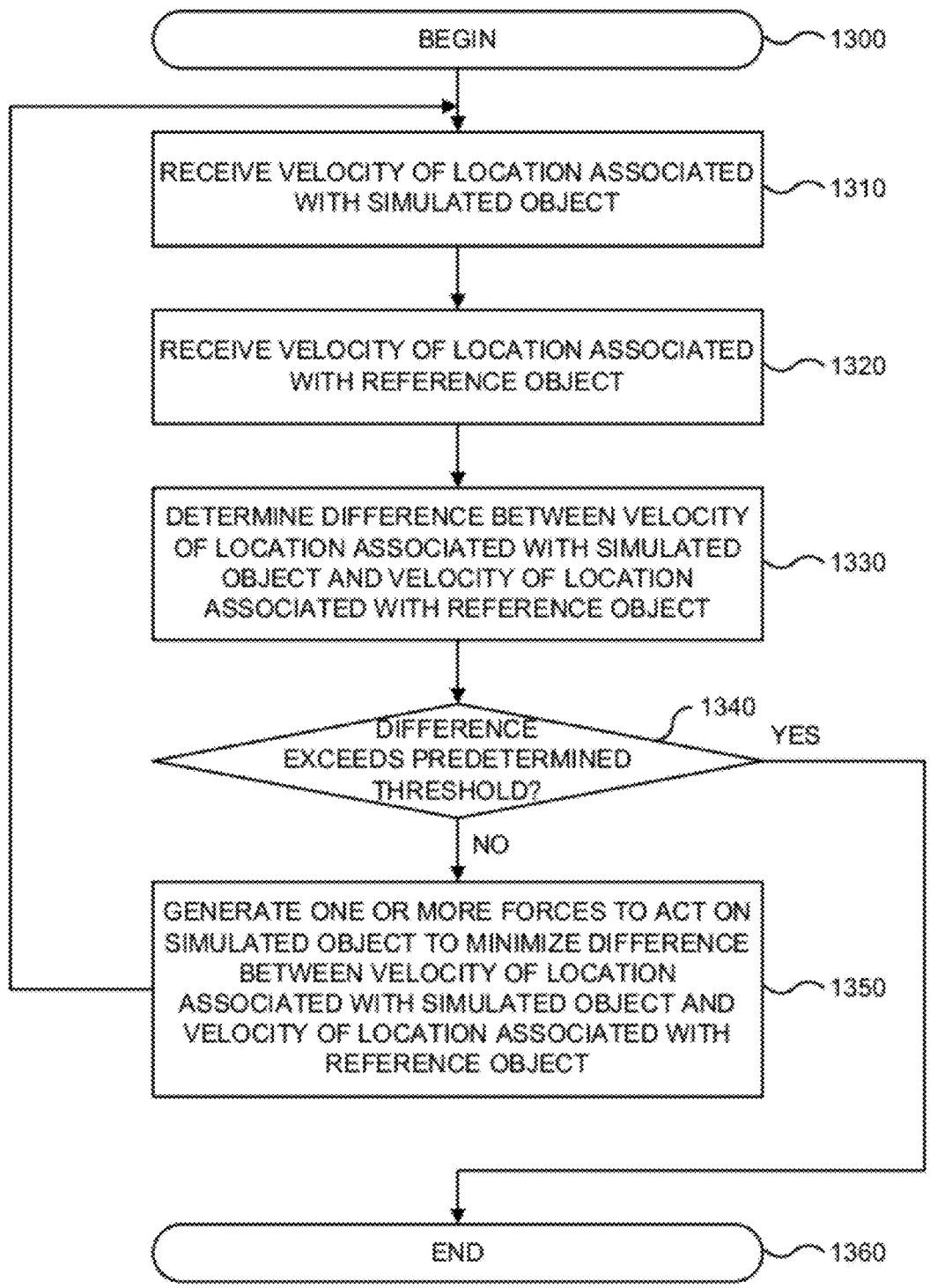

FIG. 13 is a simplified flowchart for preserving shape of a simulated object using velocity dragging in one embodiment.

Figure 14:
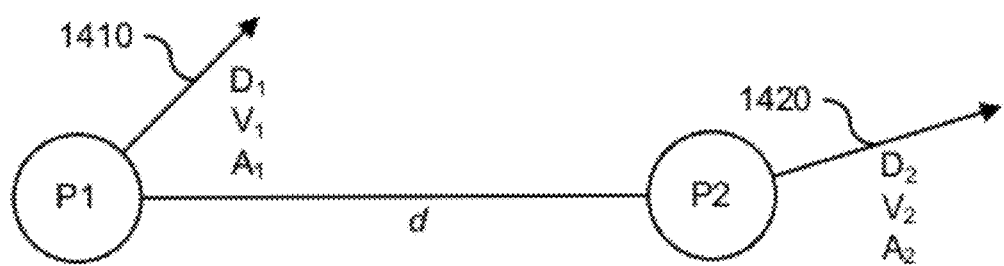

FIG. 14 is simplified block diagram of a point associated with a simulated object and a reference point associated with a reference or non-simulated object in one embodiment.

Figure 15A:
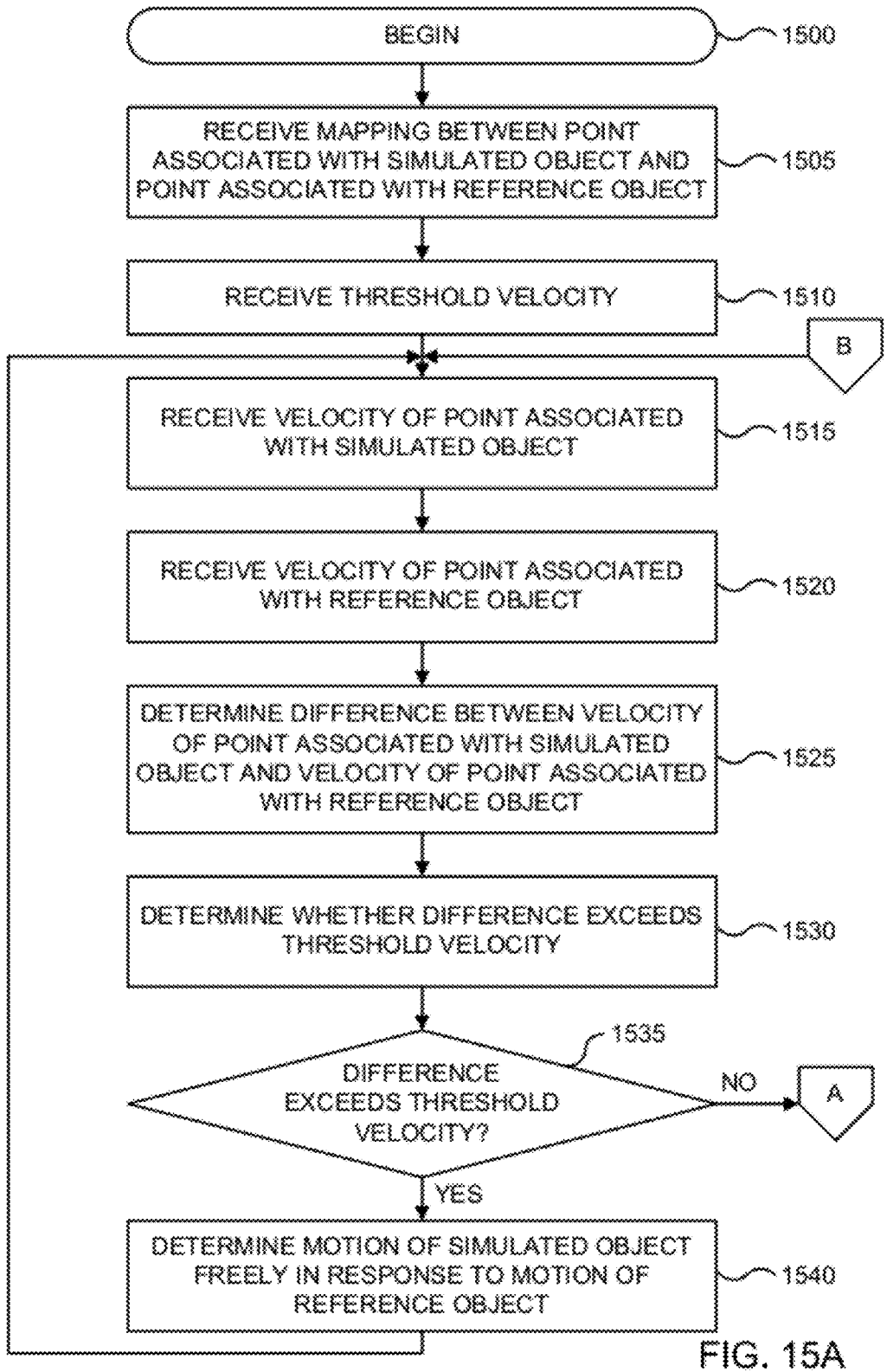
Figure 15B:
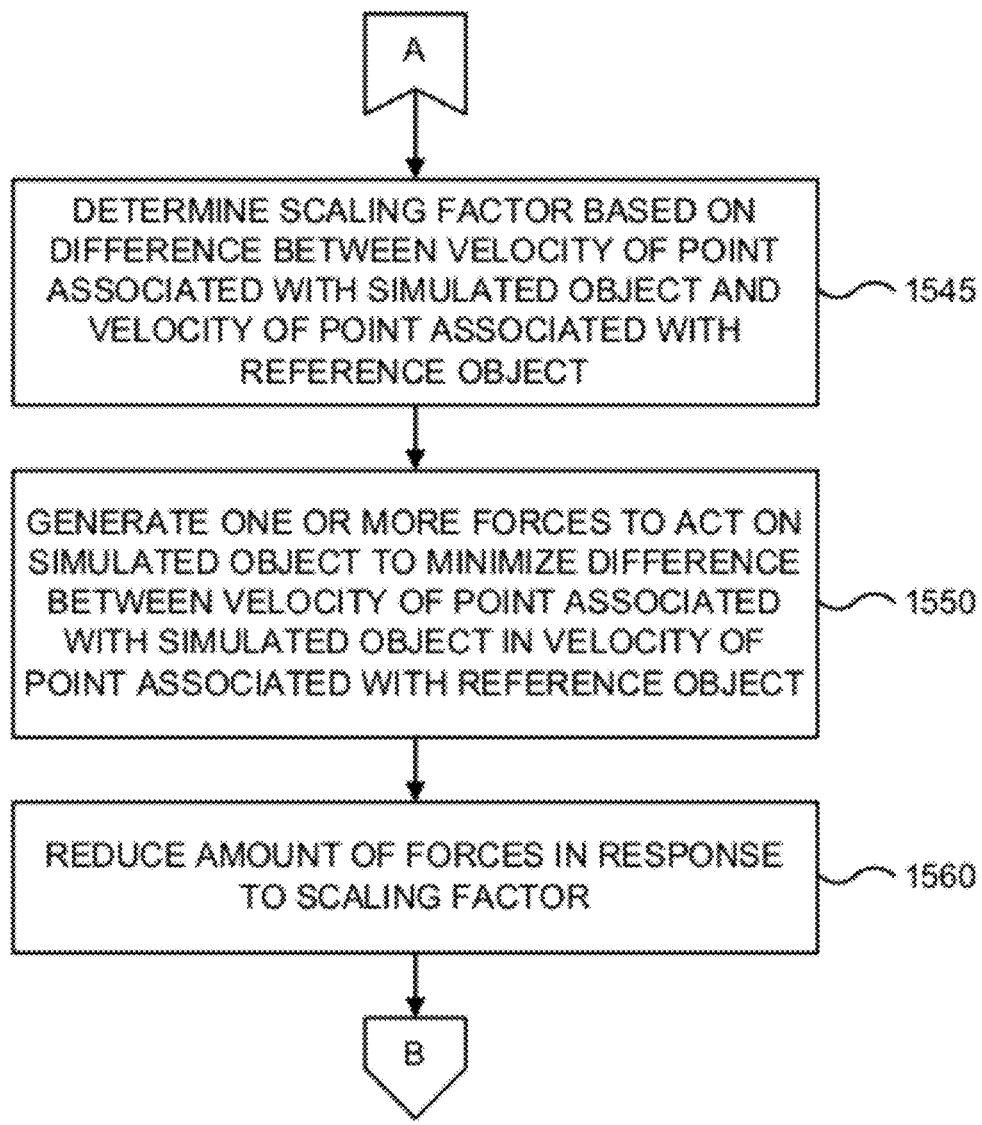

FIGS. 15A and 15B are a flowchart for preserving shape of a simulated object using velocity dragging in one embodiment according to the present invention.

Figure 16:
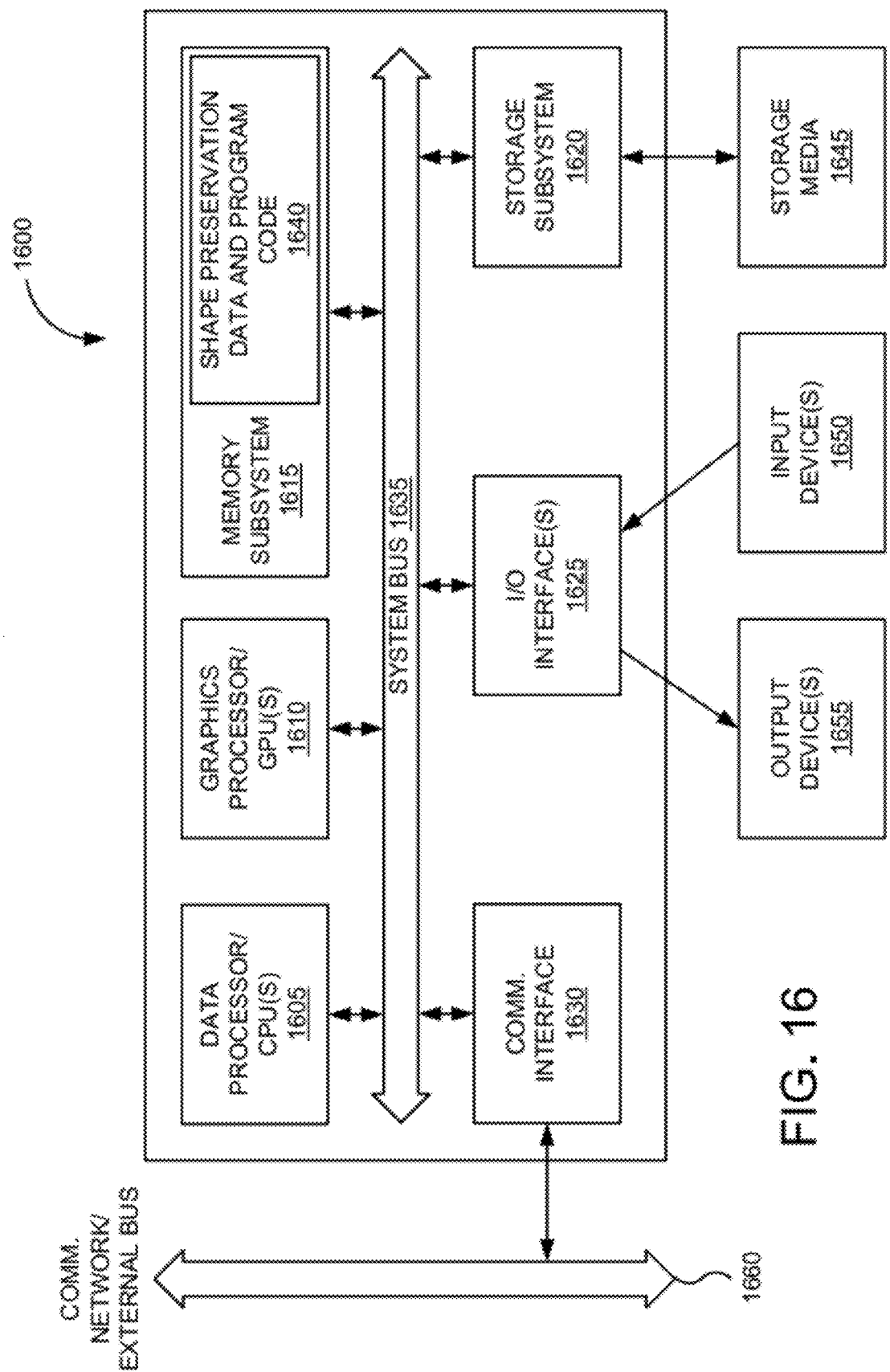

FIG. 16 is a block diagram of a computer system or information processing device that may incorporate an embodiment, be incorporated into an embodiment, or be used to practice any of the innovations, embodiments, and/or examples found within this disclosure.

DETAILED DESCRIPTION

This disclosure relates to computer-generated imagery (CGI) and computer-aided animation. More specifically, this disclosure relates to techniques for preserving the shape of simulated and dynamic objects for use in CGI and computer-aided animation.

In various embodiments, simulated objects are elements of a computer animation display. The computer animation display may include simulated objects (e.g., secondary or dynamic object) such as cloth, garments and clothing, hair, and fur. The computer animation display may further include reference objects (e.g., kinematic, non-simulated objects, or other simulated objects), such as characters and/or collision objects.

Typically simulated objects are modeled, described, or represented as a collection of particles, connected to each other in some manner. In one example, a topological mesh is used in the case of clothing. In another example, a collection of strands or linear objects are used to describe hair or fur. In some aspects, a simulation computer program may incorporate the disclosed techniques to better display in visually desirable manners simulated objects that response to changes in motions and positions of reference or non-simulated objects.

Figure 1:
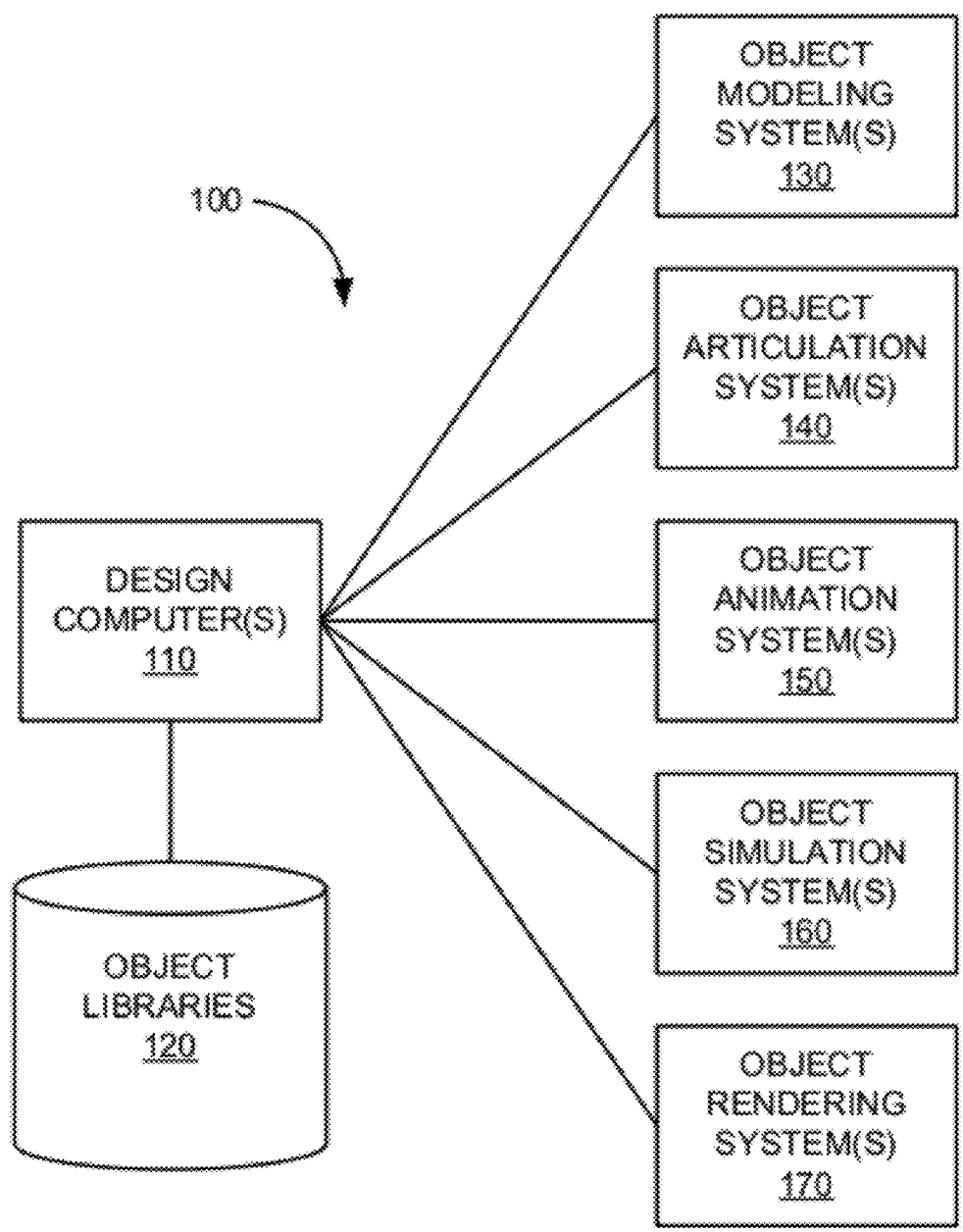
FIG. 1 is a simplified block diagram of a system for creating computer graphics imagery (CGI) and computer-aided animation that may implement or incorporate various embodiments or techniques for preserving the shape of simulated and dynamic objects.

FIG. 1 is a simplified block diagram of system 100 for creating computer graphics imagery (CGI) and computer-aided animation that may implement or incorporate various embodiments or techniques for preserving the shape of simulated and dynamic objects. In this example, system 100 can include one or more design computers 150, object library 120, one or more object modeler systems 130, one or more object articulation systems 140, one or more object animation systems 150, one or more object simulation systems 160, and one or more object rendering systems 170.

The one or more design computers 150 can include hardware and software elements configured for designing CGI and assisting with computer-aided animation. Each of the one or more design computers 150 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 150 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 150 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 150 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 150 acting as an animator may employ one or more systems or tools to specify motion and position of one or more objects over time to produce an animation.

Object library 120 can include hardware and/or software elements configured for storing and accessing information related to objects used by the one or more design computers 150 during the various stages of a production process to produce CGI and animation. Some examples of object library 120 can include a file, a database, or other storage devices and mechanisms. Object library 120 may be locally accessible to the one or more design computers 150 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 150 and/or automatically invoked by or used by one or more processes associated with the one or more design computers 150. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 150 and/or automatically invoked by or used by one or more processes associated with the one or more design computers 150. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 150 and/or automatically invoked by or used by one or more processes associated with the one or more design computers 150. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 150 and/or automatically invoked by or used by one or more processes associated with the one or more design computers 150. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 150 and/or automatically invoked by or used by one or more processes associated with the one or more design computers 150. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 150, object library 120, the one or more object modeler systems 130, the one or more object articulation systems 140, the one or more object animation systems 150, the one or more object simulation systems 160, and/or the one or more object rendering systems 170 that provide one or more tools for preserving the shape of simulated and dynamic objects.

Auto Scaling Object Properties

In various embodiments, system 100 enables auto-scaling of properties of a simulated object associated with a reference object. For example, in an animation where a human character (e.g., a reference object) is wearing a jacket (e.g., a simulated object), and the human character has been animated in a cartoony or physically exaggerated manner, system 100 automatically adjusts the at-rest shape (or rest state) of the cloth forming the jacket. Thus, the jacket attempts to maintain itself in a new at-rest shape or desired rest state. Thus, the jacket appears to fold, wrinkle, and hang down normally as if the human character was not animated in the cartoony or physically exaggerated manner.

Accordingly, in one embodiment, system 100 receives a metric associated with a reference object. In response to the metric, system 100 adjusts a value associated with a property of a simulated object in response to the metric. In various embodiments, the value associated with the property of the simulated object is related to the at-rest shape or a desired rest state of the simulate object.

Thus, system 100 enables the automatic monitoring, detection, calculating, or measuring of a reference object (e.g., a non-simulated or kinematic object) and the communication of a metric indicative of the calculation or measurement to a simulated object associated with the reference object. System 140 uses the metric to automatically adjust how the simulated object reacts to itself and expected external forces to maintain its shape. Thus, the at-rest shape or desired rest state of the simulated object may be automatically adjusted by system 100 to provide more visually pleasant animations of the simulated object.

Consider again the animation of the human character, standing upright and wearing the jacket. The human character (i.e., a reference or non-simulated object) is directly animated, while motions and positions of the jacket (i.e., the simulated or dynamic object) are simulated using physically-based numerical techniques in response to the human character's animation. According to techniques of the present invention, the actual length is changed of a torso area of the jacket in response to changes in the human character's measurements, such as when the human character is animated in a physically exaggerated manner. The jacket is not shrunk or stretched in response to the human character's measurements, but the at-rest shape or desired rest state is adjusted to be at the new actual length of the human character. In one example, a geometric property related to the desired rest state of the torso area of the jacket is adjusted to achieve a more desired look or realistic feel during animation.

FIG. 2 is a screenshot depicting a human character wearing a jacket at pose-time in one embodiment. The human character of FIG. 2 is wearing a jacket whose motion may be simulated by system 100 using a physically-based numerical technique. Additionally, motions and positions of the jacket may be influenced by motions and positions of the human character (e.g., the reference object). FIG. 2 shows that that the jacket (or the cloth of the jacket) fits relatively snug in portion 210 on the human character. For example, there are little or no wrinkles present around the neck and along the torso of the human character in portion 210.

FIG. 3A is a screenshot depicting the human character of FIG. 2 in a physically exaggerated pose where the jacket includes visually undesirable features in one embodiment. FIG. 3A depicts the human character bent forward. In this example, the human character has been posed by the animator in a physically exaggerated manner such that a neck-to-waist measurement of the human character is reduced.

FIG. 3A depicts that without using techniques of the present invention, the cloth of the jacket bunches and produces extra material and an unpleasant puckering around the neck. For example, in area 310, wrinkles are present around the neck of the human character at the top of portion 210. Additionally, in area 310, wrinkles are present along the torso where the cloth of the jacket produces extra folding-over at the waistline of the human character at the bottom of portion 210.

FIG. 3B is a screenshot depicting the human character of FIG. 2 in a physically exaggerated pose where a portion of the jacket has been auto-scaled to reduce visually undesirable features in one embodiment. FIG. 3B also depicts the human character bent forward in the same pose by the animator in which the neck-to-waist measurement of the human character is reduced. By applying techniques of auto-scaling properties of simulated objects, FIG. 3B depicts that the bunching, extra material, and an unpleasant puckering around the neck, as previously show in area 310, is reduced in area 330 at the top of portion 210. In addition, FIG. 3B depicts a reduction in area 340 at the bottom of portion 210 in the extra folding-over at the waistline of the human character, as previously depicted in area 320.

Thus, system 100 enables an automatic reduction in the length of the front portion 210 of the jacket as the neck-to-waist measurement of the human character is reduced. Advantageously, by monitoring properties (e.g., geometric properties) of the human character, and adjusting a property (e.g., the desired rest length) of portion 210 of the jacket, system 100 reduces extra material of the jacket that would otherwise cause the unpleasant puckering around the neck and the extra folding over at the waistline.

Accordingly, in various embodiments, communication of changes in a reference or non-simulated object, such as changes in length, width, and height of a geometric property is provided to a simulated object associated with the non-simulated object. Thus, one or more properties of the simulated object (such length, width, height, angle, momentum, rotation, mass, and density) may be automatically changed or adjusted. This alters the at-rest shape or desired rest state that the simulated object seeks to maintain with the property to provide a more visually pleasant animation, such as reducing extra folds and wrinkles in clothing.

FIG. 4 is a simplified flowchart of a method for auto-scaling properties of a simulated object associated with a reference object in one embodiment. Implementations of or processing in the method depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method depicted in FIG. 4 begins in step 400.

In step 410, system 100 monitors a portion of a reference object. In some embodiments, system 100 measures a property associated with the reference object. Some examples of properties are geometric properties (e.g., position, location, dimensions, distance, length, width, height, and angle), physical properties (e.g., mass, weight, velocity, acceleration, motion, position, momentum), animator specified properties, and the like. Some examples of reference objects are kinematic or non-simulated objects, simulated objects, and the like.

In step 420, system 100 determines a metric associated with the portion of the reference object. In general, a metric is any result or indication of a calculation, determination, or measurement. A metric may be indicative of a scalar value, a vector value, an angle, a coordinate system, location, a range, a difference, a higher/lower indicator, and the like.

Consider again our exemplary animation of the human character of FIG. 2, standing upright and wearing a jacket. In this example, the human character is provided with a curve from the neck to the waist of the human character. The curve includes one or more points along the curve. To determine a metric associated with the portion of the human character from the neck to the waist, system 100 measures distances between the one or more points along the curve to determine the entire length of the curve, and hence the length of the neck to waist portion of the human character. In another example, to determine a metric associated with the human character, system 100 calculates an angle of a knee joint associated with the human character.

In some embodiments, system 100 may generate a signal indicative of the metric, and communicate the signal to the simulated object. A signal is any message, act, or event that conveys or indicates information. In one example, system 100 generates a message including the metric, and transmits the message to the simulated object. In another example, system 100 instructs a computer simulation program to read the metric from an address in memory during simulation.

In step 430, system 100 adjusts a rest state associated with the simulated object in response to the metric. In general, physical simulation (i.e., physically-based numerical techniques) of objects employs modeling the physics, such as internal forces and stresses, arising inside the object as well as external forces, such as gravity and collisions with other objects. One of the key parameters of physically-based numerical techniques is the at-rest shape or desired rest state of a simulated object.

An at-rest shape or rest state describes the size and shape that a simulated object seeks to maintain absent external forces and/or in light of expected external forces like gravity. For example, the jacket associated with the human character has a length of 140 cm in a desired rest state. While the jacket is stretched, the jacket is not longer in the desired rest state and may have a length of 145 cm. After the stretching, the length of the jacket returns to the desired rest state (or at-rest shape) and remains at 140 cm in response to internal forces that model the physics of the cloth that forms the jacket.

In the example of the jacket, in response to a physically exaggerated animation of the human character, in which the neck to waist length of the human character decreases, system 100 adjusts, or in this case reduces, the length of the torso area of the jacket to a desired rest state of 90 cm. System 140 has not shrunk the jacket as the sleeves and other portions of the jacket may retain their initial construction. Instead, system 100 adjusts a property of a portion of the jacket (e.g., the torso area) where the property is related to the at-rest shape or desired rest state. Advantageously, the adjusting of a property related to the desired rest state of the jacket, system 100 achieves a more desired look or realistic feel of the jacket during animation.

Accordingly, in various embodiments, system 100 does not stretch or shrink the simulated object, but changes the construction of the simulated object. Thus, the shape of the simulated object that it seeks to maintain absent stretching or polling forces has been altered in response to changes, for example, in the shape of the reference object. FIG. 4 ends in step 440.

FIG. 5 is a flowchart of a method for auto-scaling the length to which a simulated object seeks to maintain at rest in response to changes in a reference object in one embodiment. Implementations of or processing in the method depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method depicted in FIG. 5 begins in step 500.

In step 510, a curve is associated with a portion of a reference object. In step 520, system 100 monitors the curve to detect a change in the length of the portion of the reference object. For example, system 100 may periodically or constantly monitor the curve for changes in one or more physical properties associated with the portion of the reference object.

In step 530, system 100 determines whether a change is detected in the length of the portion of the reference object. Based on a negative determination in step 540, system 100 continues processing in step 520 to monitor the curve to detect a change in the length of a portion of the reference object. Based on a positive determination in step 540, system 100 determines the current length of the portion of the reference object in step 550.

In step 560, system 100 adjusts a value of the length to which portion of the simulated object seeks to maintain in response to current length associated with curve. FIG. 5 ends in step 570.

FIGS. 6A and 6B are illustrations depicting auto-scaling length of a simulated object in response to length of a non-simulated object in one embodiment.

FIG. 6A depicts a curve 610 of a non-simulated object having a length $L_1$ associated with a line 620 of a simulated object having a length $L_2$ at time $T_1$. The black dots represent a set of points along curve 610. In this example, motions and positions of line 620 are influenced by motions and positions of curve 620. Additionally, the motions and positions of line 620 are simulated using physically-based numerical techniques.

FIG. 6B depicts curve 610 at time $T_2$. In this example, the length of curve 610 at time $T_2$ is $L'_1$ where $L_1 > L'_1$. System 140 measures the length $L'_1$ of curve 610 at time $T_2$. System 140 generates a signal to line 620 in response to the length $L'_1$ of curve 610. System 140 then adjusts the length of line 620 to $L'_2$ in response to the signal. The length of line 620 in FIG. 6B is such that $L_2 > L'_2$.

FIGS. 7A and 7B are illustrations depicting auto-scaling width of a simulated object in response to an angle associated with a non-simulated object in one embodiment according to the present invention.

FIG. 7A depicts a joint 710 associated with a non-simulated object having angle θ and a surface 720 associated with a simulated object having a width W at time $T_1$. In this example, motions and positions of surface 720 are influenced by motions and positions of joint 710. Additionally, the motions and positions of surface 720 are simulated using physically-based numerical techniques.

FIG. 7B depicts joint 710 at time $T_2$. In this example, the angle of joint 710 is θ' where θ<θ'. System 140 calculates the angle θ' of joint 710 at time $T_2$. System 140 generates a signal to surface 720 in response to the angle θ' of the joint 710. System 140 then adjusts the width of surface 720 to W' in response to the signal. The width of surface 720 in FIG. 7D is such that W<W'.

Accordingly, in one aspect, a method for simulating objects may include the steps of receiving information specifying a property of an object whose motion is determined by a simulation of the object according to a model that defines physics of the simulation, the property related to the rest state of the object; receiving a metric associated with a reference object; and modifying a value associated with the property of the object in response to the metric to invoke a change in the rest state of the object. The property of the object may be a geometric property of the simulated object. In another aspect, shape of the object may be related to the rest state of the object such that the shape responds to one or more internal forces that are a function of the shape and the rest state. In various embodiment, rest state information may be scaled based on the received metric.

In further aspect, modifying the value associated with the property of the object may include either increasing or decreasing the value of the property in response to the metric. In one embodiment, receiving the metric associated with the reference object may include receiving a set of values associated with one or more physically exaggerated animation variables of the reference object. Receiving the metric associated with the reference object may further include receiving a set of measurements associated with one or more properties of the reference object, wherein the one or more properties may be at least one of a length, an angle, motion, position, and mass. Receiving the metric associated with the reference object may further include calculating a length between one or more locations associated with a surface of the reference object.

In a still further embodiment, a computer-readable medium may include computer-executable instructions for simulating motion of objects. The computer readable medium may include code for receiving information specifying a property of an object whose motion is determined by a simulation of the object according to a model that defines physics of the simulation, the property related to the rest state of the object; code for receiving a metric associated with a reference object; and code for modifying a value associated with the property of the object in response to the metric to invoke a change in the rest state of the object.

Shape Friction

In various embodiments, system 100 enables an animator to preserve or maintain the shape of simulated objects, such as cloth and hair, to provide visually appealing animations.

Consider an example in which a jacket (i.e., a simulated object) is associated with an animated character (i.e., a non-simulated or kinematic object). In this example, the character has been walking, but has just stopped. The motions of the jacket may be simulated as influenced by the motions of the character using traditional physically-based numerical techniques. Accordingly, due to traditional physically-based numerical techniques, folds and wrinkles under the arms and down the torso of the character remain in motion until settling down after the character has remained motionless for a few seconds.

This undesired action of the jacket (e.g., the creeping or oozing of the cloth of the jacket) is visually displeasing during animation. In response to traditional physically-based numerical techniques, a slow creeping or oozing starts under the arms and down the torso of the character. The creeping or oozing occurs even though the overall difference between when the character stops moving and when the motion of the jacket settles is small.

According to various embodiments, system 100 enables shape preservation using techniques for shape friction during simulation of objects in a computer animation display. For example, a simulated object may be associated with a reference object (e.g., a non-simulated object). Motions and positions of the simulated object may be influenced by motions and positions of the non-simulated object. Additionally, the motions and positions of the simulated object may be simulated using physically-based numerical techniques.

In these embodiments, system 100 receives a reference or target shape associated with the simulated object. System 140 then determines a different between the target shape and a measured shape (e.g., the current shape) of the simulated object. While there exists a difference between the target shape and the measured shape, system 100 attempts to reduce the error between the target shape and the measured shape. To do so, system 100 may generate one or more forces to act on the simulated object to reduce the difference between the target shape and the measured shape.

In some embodiments, system 100 uses a measure of distance as the "shape" associated with a simulated object. The distance between a particles and a set of neighboring particles provides an acceptable measure of the shape of the simulated object. For example, a position of a first particle associated with the simulated object and a position of a second particle associated with the simulated object are determined. The second particle may be in the set of particles that neighbor the first particle.

Accordingly, system 100 enables simulated objects to be free to move in response to the motions of reference or non-simulated objects. When a difference between a target shape is measured or detected (e.g., in displacement, distance, velocity, etc.), the shape of the simulated object is preserved by applying one or more forces to particles such that the shape of the entire simulated object or a portion of the simulated object is maintained. In some embodiments, these forces acts like an internal friction force to maintain the shape of the simulated object and a provide a more visually pleasant simulation of the simulated object. In some embodiments, once motion of a reference or non-simulated object exceeds a predetermined threshold (e.g., a predetermined maximum velocity), the friction force preserving the shape is overcome, and the simulated object is free to fully move in response to the non-simulated object.

FIGS. 8A and 8B are screenshots of a human character wearing a jacket. FIG. 8A depicts a non-simulated human character who has just stopped walking. The human character is wearing a jacket that may be simulated by system 100 using a physically-based numerical technique. Additionally, the motions and positions of the jacket may be influenced by motions and positions of the human character as animated or posed by an animator.

In FIG. 8A, at the moment the human character ceases walking, there are folds and wrinkles in motion starting at the sleeve and down the torso of the human character in area 810. The folds and wrinkles continue moving in a creeping or oozing behavior for a small number of seconds after the human character stops walking.

FIG. 8B depicts the human character after the motion of the folds and wrinkles of the jacket stop. In this example, the crease line down the arm has changed slightly and the wrinkle across the right shoulder has shifted in area 810. Many of the folds and wrinkles along the torso have disappeared. The vertical wrinkle down the torso has smoothed out, and the cloth of the jacket appears to wear naturally on the human character.

Accordingly, in various embodiments, while the human character is walking, system 100 detects the motion of the jacket, and allows the folds and wrinkles in the cloth of the jacket to be simulated using physically-based numerical techniques. When the human character ceases walking, system 100 detects the changes in speed, direction, and the like.

Thus, system 100 automatically applies forces to particles that form the jacket to maintain the shape of the jacket according to various techniques to preserve the shape of the jacket. Therefore, the state of the jacket depicted in FIG. 8A is reached and remains at the point in time when the human character stops walking. Advantageously, system 100 reduces or eliminates the creeping or oozing behavior of the cloth of the jacket from FIG. 8A to FIG. 8B after the characters stops moving.

In some embodiments, system 100 provides techniques to allow an animator to specify how positions of particles associated with a simulated object (e.g., the jacket of FIGS. 8A and 8B) relative to themselves are influenced by motions of a reference object or a non-simulated object (e.g., the human character of FIGS. 8A and 8B). For example, if the motions of the human character cause one or more metrics to exceed a predetermined threshold, such as when the character is moving normally, system 100 allows the jacket to change shape by adjusting the relative positions of particle of the jacket to allow the jacket to appear responsive to the characters motions. In other words, when the character is moving at or above a particular speed, system 100 allows the jacket to fold and wrinkle.

If the motions of the character do not cause one or more metrics to exceed a predetermined threshold, such as when the character is slightly moving or moving during "keep alive" motion, system 100 may apply one or more forces to the particles of the jacket, such as a friction force, to maintain the relative distances or positions between the particles of all or part of the jacket. Therefore, when the character slows down to under a particular speed or stops, system 100 advantageously preserves the shape of the jacket to prevent the appearance of the creeping or oozing folds and wrinkles.

In general, shape friction is a technique that allows system 100 to simplify the complicated frictional aspects arising from a multitude of contacts between simulated objects, such as cloth or hair. In the real world, friction is primarily a surface phenomenon, with forces generated where ever two surfaces come into contact. With regard to simulated cloth and hair, generally the effect of internal friction in cloth and hair is to make the cloth or hair hold a particular shape whenever externally imposed forces on the cloth or hair are low, and the cloth or hair is at rest. However, when the external imposed forces become large enough or if the velocity of the cloth or hair is large, the friction forces are overcome, and the cloth or hair can easily change it shape. Once the external forces seeking to move the cloth or hair become low again, and the cloth or hair has regained a low velocity, the friction forces once again serve to lock the cloth or hair into its new shape. Accordingly, in some embodiments, shape friction is applied to couple a simple three-dimensional model of a shape to internal 3-D forces (as opposed to 8-D frictional forces) in a way that emulates the response of cloth or hair to frictional forces.

FIG. 9 is a simplified flowchart of a method for preserving shape of a simulated object using shape friction in one embodiment according to the present invention. Implementations of or processing in the method depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method depicted in FIG. 9 begins in step 900.

In step 910, system 100 receives a reference shape or target shape associated with a simulated object. In one example, system 100 receives a target distance between a first particle associated with the simulated object and a second particle associated with the simulated object. In some embodiments, the second particle may be a single particle that is adjacent to or neighboring the first particle. In another example, the second particle may be found two or three particles out or away from the first particle. The second particle may also be or represent a set of one or more particles.

In step 920, system 100 receives a measured shape associated with simulated object. In one example, system 100 receives a metric associated with the first particle and the second particle. A metric is any value or measurement. For example, system 100 may receive a measurement of distance, velocity, acceleration, and the like. Speed or velocity may be measures as a derivative of a force acting on a particle. The metric may represent other higher order derivatives. Another example of the metric is a vector that represents the velocity and direction.

In step 930, system 100 determines a difference between the target shape and a measured shape. For example, system 100 may determine a difference between a target distance and an actual or measure distance between the first particle and the second particle. In another example, system 100 determines a difference between a target displacement (e.g., distance, direction, velocity, acceleration, etc.) and an actual or measure displacement. In one example, system 100 may determine whether the difference between the target shape and the measured shape satisfies or fails to satisfy a set of conditions.

In step 940, system 100 generates one or more forces to act on the simulated object to reduce the difference between the target shape and the measured shape. The one or more forces may be a friction force or a dragging force. The forces, for example, may slow the velocity of the first particle or accelerate the first particle toward the second particle such that the difference between the target shape and the measured shape is reduced.

Therefore, in various embodiments, system 100 reduces creeping or oozing that may be caused by simulating objects using physically-based numerical techniques. As a result, system 100 quickly reduces error between a target shape and a measured shape such that the state of shape of the simulated object is reached at an acceptable point in time to provide visually acceptable simulations. FIG. 9 ends in step 950.

In various embodiments, the basics of shape friction may be most simply described by considering a pair of particles, with the distance between the pair of particles be considered their "shape." Although distance by itself doesn't necessarily convey shape, if every particle in a cloth mesh tries to maintain a specific distance to a set of neighboring particles in the mesh, simultaneously maintaining all of those distances does indeed maintain the shape of the cloth over each particles neighborhood. The above description may be applied to other simulated objects, such as hair, grass, trees, and other plants.

FIG. 14A is simplified block diagram of a particle P1 and particle P2 associated with a simulated object 1400 in one embodiment according to the present invention. In this example, particle P1 is moving in a particular direction $D_1$, at a given velocity $V_1$, and at a given acceleration $A_1$. For example, vector 1410 may indicate the direction and/or magnitude of the velocity associated with particle P1. Vector 1410 may also indicate the magnitude and direction of a force accelerating particle P1.

Particle P2 is moving in a particular direction $D_2$, at a given velocity $V_2$, and at a given acceleration $A_2$. For example, vector 1420 may indicate the direction and/or magnitude of the velocity associated with particle P2. Vector 1420 may also indicate the magnitude and direction of a force accelerating particle P2.

In some embodiments, system 100 maps particle P1 to P2 as a reference particle or point. System 140 may attempt to match the velocity, direction, acceleration, etc. of particle P1 to the velocity, direction, acceleration, etc. of the reference particle P2.

Consider, for example, the two particles P1 and P2 in space, where the positions of the particles are given by $p_1$ and $p_2$. Let the velocities of the two particles be represented by $v_1$ and $v_2$. Let d represent a target distance desired between the two particles. A shape friction force $F_1$ maybe be defined to act on one of the particles by using equation (1):

$$F_1 = -k(\text{length}(p_1 - p_2) - d)\frac{(p_1 - p_2)}{\text{length}(p_1 - p_2)} \quad (1)$$

where length(p) defines the length of a vector and k is a positive spring-stiffness constant. In various embodiments, system 100 generates the friction force $F_1$ to act on particle P1 to keep particle P1 the distance d from particle P2.

In some embodiments, system 100 provides one or more guiding limits on the behavior friction force $F_1$. For example, system 100 may provide a tolerance distance that satisfies equation (2):

$$-\text{tol} < \text{length}(p_1 - p_2) - d < \text{tol} \quad (2)$$

for some chosen tolerance distance tol. In the above form, equation (2) may be viewed as a constraint on d, or the shape. For example, suppose that we choose a tolerance of tol equal to 0.1 where d is equal to 1.5. As long as the particles remained between a distance of 1.4 and 1.6 apart, system 100 exerts a force that tries to bring the particles back to a distance of 1.5 apart. However, external forces act so as to force the particles outside of this range, system 100 modifies d to maintain the inequality of equation (2).

Accordingly, if system 100 determines that the particles have moved to a distance of 1.8 apart, system 100 updates the target distance d to be d=1.8−tol=1.7. Thus, when system 100 determines $F_1$, the magnitude of $F_1$ has been implicitly limited, because the target distance d may be within some tolerance of the current distance between the particles.

In some embodiments, system 100 reduces the forces acting on the particles as the "shape velocity" between the particle P1 and particle P2 moves away from zero. The force $F_1$ that may actually be exerted on particle P1 may be provided equation (3):

$$\left(1 - \frac{\text{length}(v_1 - v_2)}{v_{max}}\right) F_1 \quad (3)$$

which reduces the force $F_1$ by a scaling factor as the difference in the velocities of particle P1 and particle P2 grows. Once the difference in the velocities reaches some threshold $v_{max}$, system 100 may turn the friction force completely off. Accordingly, if a predetermined level, point, value, or threshold is reached or exceeded, system 100 allows the simulated object to be freely influenced without preserving shape.

In some embodiments, system 100 exerts force $F_1$ on particle P1 and an opposite force $-F_1$ on particle P2. As discussed previously, if the particles are forced to far apart, system 100 updates the distance d to stay within the range given by equation (2), which effectively changes the shape to which the cloth or hair wants to hold. Similarly, if the differences in velocities between the particles becomes large, system 100 further limits the friction force. Once the differences in velocities become smaller again, system 100 then allows the shape-friction force to act once more.

In some embodiments, for example with simulated objects such as cloth or hair, system 100 records for each particle a separate distance d to each neighboring particle, along with a stiffness k and a maximum velocity of $v_{max}$. The number of neighboring particles may be provided as a parameter to system 100. For example, the larger the neighboring set of particles, the more strongly shapes can be held.

Additionally, in some embodiments, the force $F_1$ may be specified as a vector in space according to equation (4):

$$F_1 = -k((p_1 - p_2) - d) \quad (4)$$

with d as a vector, as opposed to a scalar, and with a limit on how much $((p_1-p_2)-d))$ can deviate before dragging d in the direction $p_1-p_2$. The vector d can be recorded either an absolute unchanging coordinate system, or can be based on a local time-varying coordinate system, arising from the kinematic or non-simulated object (i.e., the animated human character).

In some embodiments, system 100 provides the force $F_1$ to a single particle, for example, when it makes sense for the "shape" to simply be the position of a particle relative to some local or fixed coordinate scheme.

FIG. 14B is a simplified block diagram of particles associated with simulated object 1400 in one embodiment according to the present invention. In this example, FIG. 14B includes particles P1, P2, P3, P4, and P5. For example, particles P1, P2, P3, P4, and P5 may form part of a cloth mesh. Particle P1 is separated from particle P2 by a distance 1430. Particle P1 is separated from particle P3 by a distance 1440. Particle P1 is separated from particle P4 by a distance 1450. Particle P1 is separated from particle P5 by a distance 1460.

In general, particles P2, P3, P4, and P5 may be considered neighboring particles to particle P1. In some embodiments, particle P5 may be considered a neighboring particle to particle P3. As discussed above, larger sets of particles or smaller set of particles may be used to provide the desired "stiffness" associated with the simulated object.

In various embodiments, system 100 attempts to maintain a target distance 1470 between particle P1 and particle P2. As discussed further below, system 100 may generate one or more forces to act on particle P1 and particle P2 to reduce the difference between the actual distance 1430 and the target distance 1470 between particles P1 and P2.

FIGS. 15A and 15B are a flowchart of a method for preserving shape of a simulated object using shape friction during motion in one embodiment according to the present invention. Implementations of or processing in the method depicted in FIGS. 15A and 15B may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method depicted in FIGS. 15A and 15B begins in step 1500. In general, the simulated object is associated with a reference object that influences motion and position of the simulated object. In this example, the simulated object includes a set of particles.

In step 1505, system 100 receives a velocity threshold (e.g., $v_{max}$). In step 1510, system 100 receives a tolerance distance (e.g., tol). In step 1515, system 100 receives a target distance between a first particle (e.g., particle P1 of FIG. 14A) and a neighboring second particle (e.g., particle P2 of FIG. 14A).

In step 1520, system 100 determines a difference between velocity of the first particle and velocity of the second particle. In step 1525, system 100 determines whether the difference between velocities exceeds the velocity threshold. In step 1530, if the difference between the velocities exceeds (or meets) the velocity threshold, in step 1535, system 100 determines motion (and position) of the simulated object in response to motion (and position) of a reference object. The flowchart then continues in step 1520. In step 1530, if the difference between velocities does not exceed the velocity threshold, in step 1540, system 100 determines a scaling factor based on the difference between the velocity of the first particle and the velocity of the second particle. FIG. 15A ends in step 1540.

FIG. 15B begins in step 1545, continuing from FIG. 15A. In step 1545, system 100 measures a current distance between the first particle and the second particle. In step 1550, system 100 determines a difference between the target distance and the measured current distance. In step 1555, system 100 determines whether the difference between the target distance and the measured current distance exceeds the tolerance distance.

In step 1560, if the difference between the target distance and the measured distance exceeds the tolerance distance, in step 1565, system 100 updates the target distance. For example, system 100 may increase or decrease the target distance by the tolerance distance.

In step 1570, system 100 generates one or more forces to act on the simulated object (e.g., on the first particle and/or on the second particle) to reduce the difference between the target shape and the measured current shape. In step 1575, system 100 reduces the amount of the one or more forces in response to the scaling factor. In some embodiments, system 100 reduces the amount of the one or more forces to nothing in response to the scaling factor if the difference between the target shape and the measured shape exceeds the tolerance distance and/or the velocity threshold is exceeded. FIG. 15B ends in step 1575.

Accordingly, system 100 eliminates or reduces the creeping or oozing behavior of the simulated object by providing internal shape friction forces, while still allowing the simulated object to move correctly with motion of an associated non-simulated object. Advantageously, system 100 allows the simulated object to move and/or change its shape or wrinkle pattern as little as possible, subject to being positioned correctly or in a visually pleasing manner on the character.

In one aspect, a method for simulating motion of objects may include the steps of receiving a target shape associated with an object whose motion is determined by a simulation according to a model defining physics of the simulation; determining a difference between the target shape and a measured shape associated with the object in the simulation; and manipulating motion of the object to be inconsistent with the model defining the physics of the simulation to reduce the difference between the target shape and the measured shape. In another aspect, the target shape may be updated when the difference between the target shape and the measured shape exceeds a predetermined tolerance. Updating the target shape may include reducing the target shape to move the target shape closer to the measured shape.

In one embodiment, receiving a target shape associated with an object may include receiving a target distance between a first portion of the object and a second portion of the object. In another aspect, distance nay be measured between a first particle associated with the object and a second particle associated with the object to determine the measured shape associated with the object. Determining the difference between the target shape and the measured shape associated with the object may include determining a difference between a target distance and a measured distance or determining a difference between a target displacement and a measured displacement.

In a further embodiment, manipulating the motion of the object to be inconsistent with the model defining the physics of the simulation to reduce the difference between the target shape and the measured shape may include generating one or more forces not related to the rest state of the object to act on the object to further reduce the difference between the target shape and the measured shape. In some embodiments, amount of one or more forces may be reduced based on a scaling factor determined in response to a difference between velocity of a first particle associated with the object and velocity of a second particle associated with the object as the difference between velocities approaches a predetermined threshold.

In a still further embodiment, a computer readable medium stores computer-executable code for simulating motion of objects. The computer-readable storage medium may include code for receiving a target shape associated with an object whose motion is determined by a simulation according to a model defining physics of the simulation; code for determining a difference between the target shape and a measured shape associated with the object in the simulation; and code for manipulating motion of the object to be inconsistent with the model defining the physics of the simulation to reduce the difference between the target shape and the measured shape.
Velocity Drag In various embodiments, system 100 allows an animator to preserve or maintain the shape of simulated objects, such as cloth and hair, to provide visually appealing animations.

Consider again the example in which a jacket (i.e., a simulated object) is associated with an animated character (i.e., a non-simulated or kinematic object). In this example, the character has been walking, but has just stopped. The motions of the jacket may be simulated as influenced by the motions of the character using traditional physically-based numerical techniques. Accordingly, due to traditional physically-based numerical techniques, folds and wrinkles under the arms and down the torso of the character remain in motion until settling down after the character has remained motionless for a few seconds.

This undesired action of the jacket (e.g., the creeping or oozing of the cloth of the jacket) is visually displeasing during animation. In response to traditional physically-based numerical techniques, a slow creeping or oozing starts under the arms and down the torso of the character. The creeping or oozing occurs even though the overall difference between when the character stops moving and when the motion of the jacket settles is small.

According to various embodiments, shape preservation is provided using velocity dragging during simulation of objects in a computer animation display. In these embodiments, a simulated object may be associated with a non-simulated object. Motions and positions of the simulated object may be influenced by motions and positions of the non-simulated object. Additionally, the motions and positions of the simulated object may be simulated using physically-based numerical techniques.

In various embodiments, a mapping is received between a point associated with a simulated object and a point associated with a reference or non-simulated object. Velocity of a location associated with a simulated object is determined or received. Velocity of a location associated with a reference object is determined or received. One or more forces are generated (e.g., velocity dragging forces) to act on the simulated object to reduce or minimize the difference between the velocity of the location associated with the simulated object and the velocity of the location associated with reference object.

Accordingly, based on differences in velocities, or other derivatives of motion and position between the simulated object and the reference or non-simulated object, one or more forces are applied to the simulated object (e.g., at the location associated with the simulated object) to substantially align or match the velocities of the location of simulated object to the location of the reference object to maintain the shape of the simulated object and provide a more visually pleasant simulation of the simulated object. In some embodiments, once motions of a non-simulated object exceed a predetermined threshold, the forces preserving the shape are overcome, and the simulated object is free to fully move in response to the non-simulated object.

FIGS. 12A and 12B are screenshots of a human character wearing a jacket. FIG. 12A depicts a non-simulated human character who has just stopped walking. The human character is wearing a jacket that may be simulated by system 100 using a physically-based numerical technique. Additionally, the motions and positions of the jacket may be influenced by motions and positions of the human character as animated or posed by an animator.

In FIG. 12A, at the moment the human character ceases walking, there are folds and wrinkles in motion starting at the sleeve and down the torso of the human character in area 1210. The folds and wrinkles continue moving in a creeping or oozing behavior for a small number of seconds after the human character stops walking.

FIG. 12B depicts the human character after the motion of the folds and wrinkles of the jacket stop. In this example, the crease line down the arm has changed slightly and the wrinkle across the right shoulder has shifted in area 1210. Many of the folds and wrinkles along the torso have disappeared. The vertical wrinkle down the torso has smoothed out, and the cloth of the jacket appears to wear naturally on the human character.

Accordingly, in various embodiments, while the human character is walking, system 100 detects the motion of the jacket, and allows the folds and wrinkles in the cloth of the jacket to be simulated using physically-based numerical techniques. When the human character ceases walking, system 100 detects the changes in speed, direction, and the like.

Thus, system 100 automatically applies forces to the jacket (e.g., at or on locations, surfaces, particles, and the like that form the jacket) to maintain the shape of the jacket. Therefore, the creeping or oozing behavior of the cloth that results in the state of the jacket depicted in FIG. 12B is not reached when the human character stops walking Advantageously, system 100 reduces or eliminates the creeping or oozing behavior of the cloth of the jacket.

In some embodiments, system 100 provides techniques to allow an animator to specify how positions of particles associated with a simulated object (e.g., the jacket of FIGS. 12A and 12B) relative to a non-simulated object (as opposed to the particles themselves as discussed above) are influenced by motions of the non-simulated object (e.g., the human character of FIGS. 12A and 12B). For example, if the motions of the human character cause one or more metrics to exceed a predetermined threshold, such as when the character is moving normally, system 100 allows the jacket to change shape by adjusting the positions of particle of the jacket with respect to human character to allow the jacket to appear responsive to the characters motions. In other words, when the character is moving at or above a particular speed, system 100 allows the jacket to fold and wrinkle.

If the motions of the character do not cause one or more metrics to exceed a predetermined threshold, such as when the character is slightly moving or moving during "keep alive" motion, system 100 may apply one or more forces to the particles of the jacket, such as a velocity dragging force, to maintain the positions of the particles of all or part of the jacket with respect to a reference position on the human character. Therefore, when the character slows down to under a particular speed or stops, system 100 advantageously preserves the shape of the jacket to prevent the appearance of the creeping or oozing folds and wrinkles.

FIG. 13 is a simplified flowchart of a method for preserving shape of a simulated object using velocity dragging in one embodiment according to the present invention. Implementations of or processing in the method depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method depicted in FIG. 13 begins in step 1300.

In step 1310, system 100 receives velocity of a location associated with a simulated object. Some examples of a location associated with a simulated object are a point, a particle, a surface region, a set of particles, a set of surfaces, and the like. The location may be on, substantially on, and near the simulated object.

In step 1320, system 100 receives velocity of a location associated with a reference object. The reference object may be a kinematic or non-simulated object, or a copy of the simulated object having a different state or at a different time.

In some embodiments, system 100 receives a mapping between a point associated with a simulated object and a point associated with a reference or non-simulated object. In general, a mapping is any rule, association, function, and the like, that establishes a relationship. For example, a point on a cloth garment may be mapped to the closest point on the skin of a character object at bind-time or pose-time.

In step 1330, system 100 determines a difference between the velocity of the location associated with the simulated object in the velocity of the location associated with reference object. In step 1340, if a difference does not exceeds a predetermined threshold, in step 1350, system 100 generates one or more forces to act on the simulated object to minimize the difference between the velocity of the location associated with the simulated object in the velocity of the location associated with the reference object.

The one or more forces may be a friction force or a dragging force. The forces, for example, may slow the velocity of the location associated with the simulated object or accelerate the location associated with the simulated object such that the velocity of the location associated with the simulated object becomes substantially align or equivalent to the velocity of the location associated with the reference object.

As a result, system 100 reduces creeping or oozing over time to provide visually acceptable simulations. In general, velocity dragging is a technique that allows system 100 to prevent the oozing or creeping of a simulated object, such as clothing or hair, while leaving the clothing or hair free to respond to keep alive motion of a reference or non-simulated object. FIG. 13 ends in step 1360.

FIG. 14 is simplified block diagram of a point P1 and point P2 in one embodiment according to the present invention. In this example, point P1 is moving in a particular direction $D_1$, at a given velocity $V_1$, and at a given acceleration $A_1$. For example, vector 1410 may indicate the direction and/or magnitude of the velocity associated with point P1. Vector 1410 may also indicate the magnitude and direction of a force accelerating point P1. Point P1 may be located on, in, or near a simulated cloth garment.

Point P2 is moving in a particular direction $D_2$, at a given velocity $V_2$, and at a given acceleration $A_2$. For example, vector 1420 may indicate the direction and/or magnitude of the velocity associated with point P2. Vector 1420 may also indicate the magnitude and direction of a force accelerating point P2. Point P2 may be located on, in, or near a reference or non-simulated object, such as a human character.

In some embodiments, system 100 maps point P1 to P2 as a reference point or location. System 140 may attempt to match the velocity, direction, acceleration, etc. of point P1 to the velocity, direction, acceleration, etc. of the reference point P2.

For example, let the position and velocity over time of a simulated cloth particle be defined where p(t) and v(t)=ṗ(t). Each cloth particle has a "tracking" position it monitors.

Typically, the tracking position of the cloth particle is a reference point on the character's skin that it is closest to. However, other reference points or tracking points may be used.

In various embodiments, system 100 uses velocity dragging to encourage a cloth particle to match the velocity $v_{track}$(t) of its reference point. Typically, system 100 does not penalize the cloth particle for being any different position than attract point, as the absolute this positions in space of the tracking points form a bad representation of a garment's shape. However, the velocity of the tracking point at any given moment in time provides an indicator or clue as to where the associated particles on the garment are to go. For example, if the human character is absolutely still, all of the tracking velocities $v_{track}(t)$ will be zero. However, the character has some small keep-alive motion, the tracking velocities $v_{track}(t)$ will reflect the keep alive-motion. Accordingly, system 100 uses velocity dragging to encourage the cloth particles to match the velocities $v_{track}(t)$ of their reference points.

In various embodiments, system 100 uses equation (5) to provide velocity dragging:

$$f(t)=F(v(t),v_{track}(t)) \quad (5)$$

In this example, the function F depends on the velocity of a particle associated with a simulated object and the velocity of a tracking or reference particle associated with a non-simulated object.

In some embodiments, to exert a simple linear drag force, system 100 may provide velocity dragging using equation (6):

$$f(t)=F(v(t),v_{track}(t))=-k(v(t)-v_{track}(t)) \quad (6)$$

which acts to make the v(t) be equal to be tracked $v_{track}(t)$, with k a user-supplied or animated coefficient. Setting k to a sufficient value overwhelms any tendency of particles to ooze, while forcing the particles to also follow the keep-alive motion.

In some embodiments, system 100 uses other derivatives then first derivatives, such as velocities. Other such higher order derivatives may also be used.

FIGS. 15A and 15B are a flowchart of a method for preserving shape of a simulated object using velocity dragging during motion in one embodiment. Implementations of or processing in the method depicted in FIGS. 15A and 15B may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method depicted in FIGS. 15A and 15B begins in step 1500.

In step 1505, system 100 receives a mapping between a location associated with a simulated object (e.g., point P1 of FIG. 14) and a location associated with a reference or non-simulated object (e.g., point P2 of FIG. 14). For example, system 100 maps a point on the simulated object to a point on the reference object. In another example, system 100 maps a point or set of points on a simulated object to a surface region honor associated with reference object.

In step 1510, system 100 receives a threshold velocity. In general, a threshold is any point, limit, or set of conditions.

In step 1515, system 100 receives a velocity of the point associated with the simulated object. For example, system 100 may receive a value indicative of the velocity of the point associated with the simulated object. In step 1520, system 100 receives a velocity of the particle associated with the non-simulated object.

In step 1525, system 100 determines a difference between the velocity of the point associated with the simulated object and the velocity of the point associated with reference object. In step 1530, system 100 determines whether the difference exceeds the threshold velocity.

In step 1535, if the difference between the velocities exceeds the threshold velocity, in step 1540, system 100 determines motion of the simulated object freely in response to motion of the reference object. In step 1535, if the difference between the velocities does not exceed the threshold velocity, system 100 continues processing in FIG. 15B.

FIG. 15B begins in step 1545. In step 1545, system 100 determines a scaling factor based on the difference between the velocity of the location associated with the simulated object and the velocity of the location associated with reference object. In step 1550, system 100 generates one or more forces to act on the simulated object to reduce or minimize the difference between the velocity of the location associated with the simulated object and the velocity of the location associated with the reference object.

As a result, in various embodiments, system 100 a dragging force to act on the point associated with the simulated object such that the velocity of the point approximates the velocity of the point associated with the reference or non-simulated object. Thus, system 100 attempts to match the velocity of the point associated with the simulated object to the velocity of the reference point. FIG. 15 ends in step 1560.

Accordingly, system 100 eliminates or reduces the creeping or oozing behavior of the simulated object by providing dragging forces, while still allowing the simulated object to move correctly with motion of an associated non-simulated object. Advantageously, system 100 allows the simulated object to move and/or change its shape or wrinkle pattern as little as possible, subject to being positioned correctly or in a visually pleasing manner on the character.

In one aspect, a method for preserving the shape of simulated objects may include the steps of receiving velocity of a location associated with a simulated object; and while a difference between the velocity of the location associated with the simulated object and velocity of a location associated with a reference object does not exceed a predetermined threshold, generating one or more forces to act on the simulated object to minimize the difference between the velocity of the location associated with the simulated object and the velocity of the location associated with the reference object.

In some embodiments, the location associated with the simulated object may be a point substantially on a surface associated with the simulated object. In other embodiments, the location associated with the reference object may be a surface region associated with the reference object. In another aspect, a mapping may be received between the location associated with the simulated object and the location associated with reference object.

In various embodiments, generating the one or more forces to act on the simulated object to minimize the difference between the velocity of the location associated with the simulated object and the velocity of the location associated with the reference object may include generating the one or more forces to act on the location associated with the simulated object to substantially align the velocity of the location associated with the simulated object with the velocity of the location associated with the reference object. In further embodiments, an amount of one or more forces may be reduced as the difference between the velocity of the location associated with the simulated object and the velocity of the location associated with the reference object approaches a predetermined threshold.

In yet another aspect, motion of the simulated object may be determined in response to the reference object when the difference between the velocity of the location associated with the simulated object in the velocity of the location associated with the reference object exceeds the predetermined threshold.

In a still further embodiment, a computer-readable medium may store computer-executable code for preserving the shape of simulated objects. The computer-readable medium may include code for receiving velocity of a location associated with a simulated object; code for receiving velocity of a location associated with a reference object; and code for generating one or more forces to act on the simulated object to minimize a difference between the velocity of the location associated with the simulated object and the velocity of the location associated with the reference object while the difference does not exceed a predetermined threshold.

FIG. 16 is a block diagram of computer system 1600 that may incorporate an embodiment, be incorporated into an embodiment, or be used to practice any of the innovations, embodiments, and/or examples found within this disclosure. FIG. 16 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1600 can include hardware and/or software elements configured for performing logic operations and calculations, input/output operations, machine communications, or the like. Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication. Computer system 1600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1605 can include hardware and/or software elements configured for executing logic or program code or for providing application-specific functionality. Some examples of CPU(s) 1605 can include one or more microprocessors (e.g., single core and multi-core) or micro-controllers. CPUs 1605 may include 4-bit, 8-bit, 12-bit, 16-bit, 32-bit, 64-bit, or the like architectures with similar or divergent internal and external instruction and data designs. CPUs 1605 may further include a single core or multiple cores. Commercially available processors may include those provided by Intel of Santa Clara, Calif. (e.g., x86, x86_64, PENTIUM, CELERON, CORE, CORE 12, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 1605 may also include one or more field-gate programmable arrays (FPGAs), application-specific integrated circuits (ASICs), or other microcontrollers. The one or more data processors or central processing units (CPUs) 1605 may include any number of registers, logic units, arithmetic units, caches, memory interfaces, or the like. The one or more data processors or central processing units (CPUs) 1605 may further be integrated, irremovably or moveably, into one or more motherboards or daughter boards.

The one or more graphics processor or graphical processing units (GPUs) 1610 can include hardware and/or software elements configured for executing logic or program code associated with graphics or for providing graphics-specific functionality. GPUs 1610 may include any conventional graphics processing unit, such as those provided by conventional video cards. Some examples of GPUs are commercially available from NVIDIA, ATI, and other vendors. In various embodiments, GPUs 1610 may include one or more vector or parallel processing units. These GPUs may be user programmable, and include hardware elements for encoding/decoding specific types of data (e.g., video data) or for accelerating 12D or 13D drawing operations, texturing operations, shading operations, or the like. The one or more graphics processors or graphical processing units (GPUs) 1610 may include any number of registers, logic units, arithmetic units, caches, memory interfaces, or the like. The one or more data processors or central processing units (CPUs) 1605 may further be integrated, irremovably or moveably, into one or more motherboards or daughter boards that include dedicated video memories, frame buffers, or the like.

Memory subsystem 1615 can include hardware and/or software elements configured for storing information. Memory subsystem 1615 may store information using machine-readable articles, information storage devices, or computer-readable storage media. Some examples of these articles used by memory subsystem 1670 can include random access memories (RAM), read-only-memories (ROMS), volatile memories, non-volatile memories, and other semiconductor memories. In various embodiments, memory subsystem 1615 can include shape preservation data and program code 1640.

Storage subsystem 1620 can include hardware and/or software elements configured for storing information. Storage subsystem 1620 may store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of shape preservation data and program code 1640 may be stored using storage subsystem 1620.

In various embodiments, computer system 1600 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 1600 may also include one or more applications configured to execute, perform, or otherwise implement techniques disclosed herein. These applications may be embodied as shape preservation data and program code 1640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1615 and/or storage subsystem 1620.

The one or more input/output (I/O) interfaces 1625 can include hardware and/or software elements configured for performing I/O operations. One or more input devices 1650 and/or one or more output devices 1655 may be communicatively coupled to the one or more I/O interfaces 1625.

The one or more input devices 1650 can include hardware and/or software elements configured for receiving information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can include hardware and/or software elements configured for outputting information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements.

A display device or monitor may be used with computer system 1600 and can include hardware and/or software elements configured for displaying information. Some examples include familiar display devices, such as a television monitor, a cathode ray tube (CRT), a liquid crystal display (LCD), or the like.

Communications interface 1630 can include hardware and/or software elements configured for performing communications operations, including sending and receiving data. Some examples of communications interface 1630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1630 may be coupled to communications network/external bus 1680, such as a computer network, to a FireWire bus, a USB hub, or the like. In other embodiments, communications interface 1630 may be physically integrated as hardware on a motherboard or daughter board of computer system 1600, may be implemented as a software program, or the like, or may be implemented as a combination thereof.

In various embodiments, computer system 1600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1600.

As suggested, FIG. 16 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for preserving shape of simulated computer-generated objects, the method comprising:
   receiving, at one or more computer systems, information indicative of velocity at a given time step in a sequence of time steps of a location associated with a first object;
   receiving, at the one or more computer systems, information indicative of velocity at the given time step of a location associated with a second object whose motion is determined by a computer simulation at the given time step;

determining, with one or more processors associated with the one or more computer systems, a difference between the velocity at the given time step of the location associated with the first object and the velocity at the given time step of the location associated with the second object;

generating, with the one or more processors associated with the one or more computer systems, information configured to influence the computer simulation to reduce the difference between the velocity at the given time step of the location associated with the first object and the velocity at the given time step of the location associated with the second object when the difference between satisfies one or more predetermined conditions; and storing, in a storage device associated with the one or more computer systems, the information configured to influence the computer simulation.

2. The method of claim 1 wherein receiving the velocity of the location associated with the first object comprises receiving velocity of a point substantially on a surface associated with an animated object.

3. The method of claim 1 wherein receiving the velocity of the location associated with the first object comprises receiving velocity of a surface region associated with an animated object.

4. The method of claim 1 further comprising:
identifying the location associated with the first object based on a mapping between the location associated with the first object and the location associated with second object; and
determining the velocity of the location associated with the first object.

5. The method of claim 1 wherein generating, with the one or more processors associated with the one or more computer systems, the information configured to influence the computer simulation comprises generating one or more inputs to the computer simulation.

6. The method of claim 1 further comprising:
generating one or more forces configured to act on the second object to minimize the determined difference between the velocity of the location associated with the first object and the velocity of the location associated with the second object based on the information configured to influence the computer simulation.

7. The method of claim 1 further comprising:
manipulating how much the computer simulation is influenced by the information configured to influence the computer simulation as the determined difference between the velocity of the location associated with the first object and the velocity of the location associated with the reference object approaches a predetermined threshold.

8. The method of claim 1 further comprising:
reducing an amount of one or more compensation forces configured to act on the second object as the velocity of the location associated with the first object approaches a predetermined threshold.

9. The method of claim 1 wherein the first object comprises a character object.

10. The method of claim 1 wherein the second object comprises a representation of cloth or hair.

11. A non-transitory computer-readable medium storing computer-executable code for preserving shape of computer-generated objects, the computer-readable medium comprising:
code for determining a difference between velocity at a given time step of a sequence of time steps of a location associated with a first object and velocity at the give time step of a location associated with a second object whose motion is determined by a computer simulation at the given time step; and
code for generating information configured to influence the computer simulation to reduce the difference between the velocity at the given time step of the location associated with the first object and the velocity at the given time step of the location associated with the second object when the difference satisfies one or more predetermined conditions.

12. The computer-readable medium of claim 11 further comprising code for receiving the velocity of the location associated with the first object as velocity of a point substantially on a surface associated with an animated object.

13. The computer-readable medium of claim 11 further comprising code for receiving the velocity of the location associated with the first object as velocity of a surface region associated with an animated object.

14. The computer-readable medium of claim 11 further comprising:
code for identifying at least one location associated with the first object based on a mapping between the at least one location associated with the first object and the location associated with second object; and
code for receiving the velocity of the location associated with the first object as velocity of the identified at least one location associated with the first object.

15. The computer-readable medium of claim 11 wherein the code for generating the information configured to influence the computer simulation comprises code for generating one or more inputs to the computer simulation.

16. The computer-readable medium of claim 11 further comprising:
code for generating one or more forces configured to act on the second object to minimize the determined difference between the velocity of the location associated with the first object and the velocity of the location associated with the second object based on the information configured to influence the computer simulation.

17. The computer-readable medium of claim 11 further comprising:
code for manipulating how much the computer simulation is influenced by the information configured to influence the computer simulation as the determined difference between the velocity of the location associated with the first object and the velocity of the location associated with the reference object approaches a predetermined threshold.

18. The computer-readable medium of claim 11 further comprising:
code for reducing an amount of one or more compensation forces configured to act on the second object as the velocity of the location associated with the first object approaches a predetermined threshold.

19. The computer-readable medium of claim 11 wherein the first object comprises a character object.

20. The computer-readable medium of claim 11 wherein the second object comprises a representation of cloth or hair.

* * * * *

UNITED STATES PATENT AND TRADEMARK OFFICE
CERTIFICATE OF CORRECTION

PATENT NO. : 8,269,778 B1  Page 1 of 1
APPLICATION NO. : 12/960196
DATED : September 18, 2012
INVENTOR(S) : Baraff et al.

It is certified that error appears in the above-identified patent and that said Letters Patent is hereby corrected as shown below:

In the Claims:
Column 33, Claim 1, Line 17: delete "between satisfies one" and insert --satisfies one--

Signed and Sealed this
Twenty-ninth Day of October, 2013

Teresa Stanek Rea
*Deputy Director of the United States Patent and Trademark Office*